(12) United States Patent
Sperduti et al.

(10) Patent No.: US 8,407,097 B2
(45) Date of Patent: Mar. 26, 2013

(54) PROXIMITY TRANSACTION APPARATUS AND METHODS OF USE THEREOF

(75) Inventors: David Sperduti, Auburn, NY (US); Thomas A. Siegler, Charlotte, NC (US); Garrison Gomez, Marietta, NY (US); William H. Havens, Marcellus, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 1411 days.

(21) Appl. No.: 10/825,088

(22) Filed: Apr. 15, 2004

(65) Prior Publication Data
US 2005/0234778 A1  Oct. 20, 2005

(51) Int. Cl.
*G06G 1/14* (2006.01)
*G06F 17/60* (2006.01)
(52) U.S. Cl. ............................... 705/22; 705/16
(58) Field of Classification Search .............. 705/22, 705/26
See application file for complete search history.

(56) References Cited

U.S. PATENT DOCUMENTS

| | | |
|---|---|---|
| 4,475,481 A | 10/1984 | Caroll |
| 5,151,769 A | 9/1992 | Immorlica, Jr. et al. |
| 5,206,495 A | 4/1993 | Kreft |
| 5,270,717 A | 12/1993 | Schuermann |
| 5,451,958 A | 9/1995 | Schuermann |
| 5,455,575 A | 10/1995 | Schuermann |
| 5,500,651 A | 3/1996 | Schuermann |
| 5,541,604 A | 7/1996 | Meier |
| 5,629,981 A | 5/1997 | Nerlikar |
| 5,939,984 A | 8/1999 | Brady et al. |
| 5,973,600 A | 10/1999 | Mosher, Jr. |
| 6,003,777 A | 12/1999 | Kowalski |
| 6,038,190 A | 3/2000 | Kowalski |
| 6,097,292 A | 8/2000 | Kelly et al. |
| 6,100,804 A | 8/2000 | Brady et al. |
| 6,130,612 A | 10/2000 | Castellano et al. |
| 6,211,799 B1 | 4/2001 | Post et al. |
| 6,229,442 B1 | 5/2001 | Rolin et al. |
| 6,247,033 B1 | 6/2001 | Kowalski |
| 6,249,227 B1 | 6/2001 | Brady et al. |
| 6,264,106 B1 | 7/2001 | Bridgelall |
| 6,275,681 B1 | 8/2001 | Vega et al. |
| 6,282,407 B1 | 8/2001 | Vega et al. |
| 6,286,763 B1 | 9/2001 | Reynolds et al. |
| 6,293,467 B1 | 9/2001 | Reddersen et al. |
| 6,307,208 B1 | 10/2001 | Cocuzza et al. |

(Continued)

FOREIGN PATENT DOCUMENTS

| | | |
|---|---|---|
| EP | 0 568 067 | 3/1999 |
| EP | 0 681 192 | 3/2000 |

(Continued)

OTHER PUBLICATIONS

"System and Method for Assigning a Funding Source for a Radio Frequency Identification" to Berardi et al., Jan. 15, 2004.*

(Continued)

*Primary Examiner* — Garcia Ade
(74) *Attorney, Agent, or Firm* — Heslin Rothenberg Farley & Mesiti P.C.

(57) ABSTRACT

The invention is a transaction terminal configured to perform a financial transaction intermediated by an RFID bearing payment token. The financial transaction is of a general type.

21 Claims, 10 Drawing Sheets

U.S. PATENT DOCUMENTS

| | | |
|---|---|---|
| 6,318,636 B1 | 11/2001 | Reynolds et al. |
| 6,319,827 B1 | 11/2001 | Kowalski et al. |
| 6,337,619 B1 | 1/2002 | Kowalski et al. |
| 6,362,738 B1 | 3/2002 | Vega |
| 6,404,340 B1 | 6/2002 | Paradiso et al. |
| 6,415,978 B1 | 7/2002 | McAllister |
| 6,415,982 B2 | 7/2002 | Bridgelall et al. |
| 6,422,476 B1 | 7/2002 | Ackley |
| 6,480,101 B1 | 11/2002 | Kelly et al. |
| 6,497,371 B2 | 12/2002 | Kayanakis et al. |
| 6,523,753 B2 | 2/2003 | Cocuzza et al. |
| 6,525,648 B1 | 2/2003 | Kubler et al. |
| 6,529,880 B1 | 3/2003 | Mckeen et al. |
| 6,547,148 B2 | 4/2003 | Kelly et al. |
| 6,577,229 B1 | 6/2003 | Bonneau et al. |
| 6,588,660 B1 | 7/2003 | Buescher et al. |
| 6,601,764 B1 | 8/2003 | Goodwin, III |
| 6,612,495 B2 | 9/2003 | Reddersen et al. |
| 6,642,837 B1 | 11/2003 | Vigoda et al. |
| 6,771,981 B1 | 8/2004 | Zalewski et al. |
| 7,228,155 B2 * | 6/2007 | Saunders ............... 455/558 |
| 7,527,198 B2 * | 5/2009 | Salim et al. ............. 235/385 |
| 2001/0042786 A1 | 11/2001 | Reynolds et al. |
| 2001/0045460 A1 | 11/2001 | Reynolds et al. |
| 2002/0011519 A1 | 1/2002 | Shults, III |
| 2002/0025796 A1 | 2/2002 | Taylor et al. |
| 2002/0074398 A1 | 6/2002 | Lancos et al. |
| 2002/0130181 A1 | 9/2002 | Reddersen et al. |
| 2002/0165758 A1 | 11/2002 | Hind et al. |
| 2002/0170969 A1 | 11/2002 | Bridgelall |
| 2002/0178063 A1 | 11/2002 | Gravelle et al. |
| 2002/0191765 A1 | 12/2002 | Labaton |
| 2002/0194135 A1 | 12/2002 | Taylor et al. |
| 2003/0112143 A1 | 6/2003 | Serra |
| 2003/0121969 A1 | 7/2003 | Wankmueller |
| 2003/0130940 A1 | 7/2003 | Hansen et al. |
| 2003/0132301 A1 | 7/2003 | Selker |
| 2003/0135417 A1 | 7/2003 | Bodin |
| 2003/0158891 A1 | 8/2003 | Lei et al. |
| 2003/0163710 A1 | 8/2003 | Ortiz et al. |
| 2003/0167207 A1 | 9/2003 | Berardi et al. |
| 2003/0172028 A1 | 9/2003 | Abell et al. |
| 2003/0173408 A1 | 9/2003 | Mosher, Jr. et al. |
| 2003/0174049 A1 | 9/2003 | Beigel et al. |
| 2003/0213844 A1 | 11/2003 | Yoshida et al. |
| 2003/0218066 A1 | 11/2003 | Fernandes et al. |
| 2003/0220835 A1 | 11/2003 | Barnes, Jr. |
| 2003/0220876 A1 * | 11/2003 | Burger et al. ............. 705/50 |
| 2003/0225623 A1 | 12/2003 | Wankmueller |
| 2003/0236872 A1 | 12/2003 | Atkinson |
| 2004/0010446 A1 | 1/2004 | Vanska et al. |
| 2004/0029569 A1 | 2/2004 | Khan et al. |
| 2004/0030601 A1 * | 2/2004 | Pond et al. ............... 705/16 |
| 2004/0049451 A1 | 3/2004 | Berardi et al. |
| 2004/0093281 A1 * | 5/2004 | Silverstein et al. ......... 705/26 |
| 2004/0103060 A1 | 5/2004 | Foth et al. |
| 2004/0118930 A1 | 6/2004 | Berardi et al. |
| 2004/0186760 A1 * | 9/2004 | Metzger ............. 705/7 |
| 2004/0230488 A1 | 11/2004 | Beenau et al. |
| 2004/0232220 A1 | 11/2004 | Beenau et al. |
| 2004/0232221 A1 | 11/2004 | Beenau et al. |
| 2004/0232222 A1 | 11/2004 | Beenau et al. |
| 2004/0232223 A1 | 11/2004 | Beenau et al. |
| 2004/0232224 A1 | 11/2004 | Beenau et al. |
| 2004/0233037 A1 | 11/2004 | Beenau et al. |
| 2004/0233038 A1 | 11/2004 | Beenau et al. |
| 2004/0233039 A1 | 11/2004 | Beenau et al. |
| 2004/0236699 A1 | 11/2004 | Beenau et al. |
| 2004/0236700 A1 | 11/2004 | Beenau et al. |
| 2004/0236701 A1 | 11/2004 | Beenau et al. |
| 2004/0238621 A1 | 12/2004 | Beenau et al. |
| 2004/0239480 A1 | 12/2004 | Beenau et al. |
| 2004/0239481 A1 | 12/2004 | Beenau et al. |
| 2004/0252012 A1 | 12/2004 | Beenau et al. |
| 2004/0256469 A1 | 12/2004 | Faenza et al. |
| 2004/0257197 A1 | 12/2004 | Beenau et al. |
| 2004/0260646 A1 | 12/2004 | Berardi et al. |
| 2005/0004866 A1 | 1/2005 | Bonalle et al. |
| 2005/0023359 A1 | 2/2005 | Saunders |
| 2005/0033619 A1 | 2/2005 | Barnes et al. |
| 2005/0033686 A1 | 2/2005 | Peart et al. |
| 2005/0033687 A1 | 2/2005 | Beenau et al. |
| 2005/0033688 A1 | 2/2005 | Peart et al. |
| 2005/0033689 A1 | 2/2005 | Bonalle et al. |
| 2005/0035847 A1 | 2/2005 | Bonalle et al. |
| 2005/0038741 A1 | 2/2005 | Bonalle et al. |
| 2005/0040242 A1 * | 2/2005 | Beenau et al. ............. 235/492 |
| 2005/0040951 A1 | 2/2005 | Zalewski et al. |
| 2005/0060233 A1 | 3/2005 | Bonalle et al. |
| 2005/0071231 A1 | 3/2005 | Beenau et al. |
| 2005/0085226 A1 | 4/2005 | Zalewski et al. |
| 2005/0116024 A1 | 6/2005 | Beenau et al. |
| 2005/0116810 A1 | 6/2005 | Beenau et al. |
| 2005/0149544 A1 | 7/2005 | Bishop et al. |
| 2005/0160003 A1 | 7/2005 | Berardi et al. |
| 2005/0165695 A1 | 7/2005 | Berardi et al. |
| 2005/0165784 A1 * | 7/2005 | Gomez et al. ............. 707/9 |
| 2005/0222961 A1 * | 10/2005 | Staib et al. ............. 705/64 |

FOREIGN PATENT DOCUMENTS

| | | |
|---|---|---|
| EP | 0 693 695 | 3/2000 |
| EP | 1 240 632 | 6/2003 |
| EP | 1 331 590 | 7/2003 |
| EP | 1 424 664 A2 | 6/2004 |
| JP | 2005520269 T | 7/2005 |
| WO | WO 91/14237 | 9/1991 |
| WO | WO 93/09516 | 5/1993 |
| WO | WO 97/42578 | 11/1997 |
| WO | WO 98/02980 | 1/1998 |
| WO | WO 98/06057 | 2/1998 |
| WO | WO 98/59319 | 12/1998 |
| WO | WO 99/00775 | 1/1999 |
| WO | WO 99/16015 | 4/1999 |
| WO | WO 00/16289 | 3/2000 |
| WO | WO 02/21424 | 3/2002 |
| WO | WO 02/073522 | 9/2002 |
| WO | WO 02/097568 A2 | 12/2002 |
| WO | WO 03/007201 | 1/2003 |
| WO | WO 03/024190 | 3/2003 |
| WO | WO 03/025850 | 3/2003 |
| WO | WO 03/036561 | 5/2003 |
| WO | WO 03/050749 | 6/2003 |
| WO | WO 03/060794 | 7/2003 |
| WO | WO 03/071396 | 8/2003 |
| WO | WO 03/081832 | 10/2003 |
| WO | WO 2004006064 A2 | 1/2004 |
| WO | WO 2004006162 A2 | 1/2004 |
| WO | WO 2004006590 A2 | 1/2004 |

OTHER PUBLICATIONS

U.S. Appl. No. 60/559,818, filed Apr. 5, 2004.

PCT International Search Report and Written opinion of the International Searching Authority dated Aug. 19, 2005, International Application No. PCT/US2005/012923, International Filing Date Apr. 14, 2005.

* cited by examiner

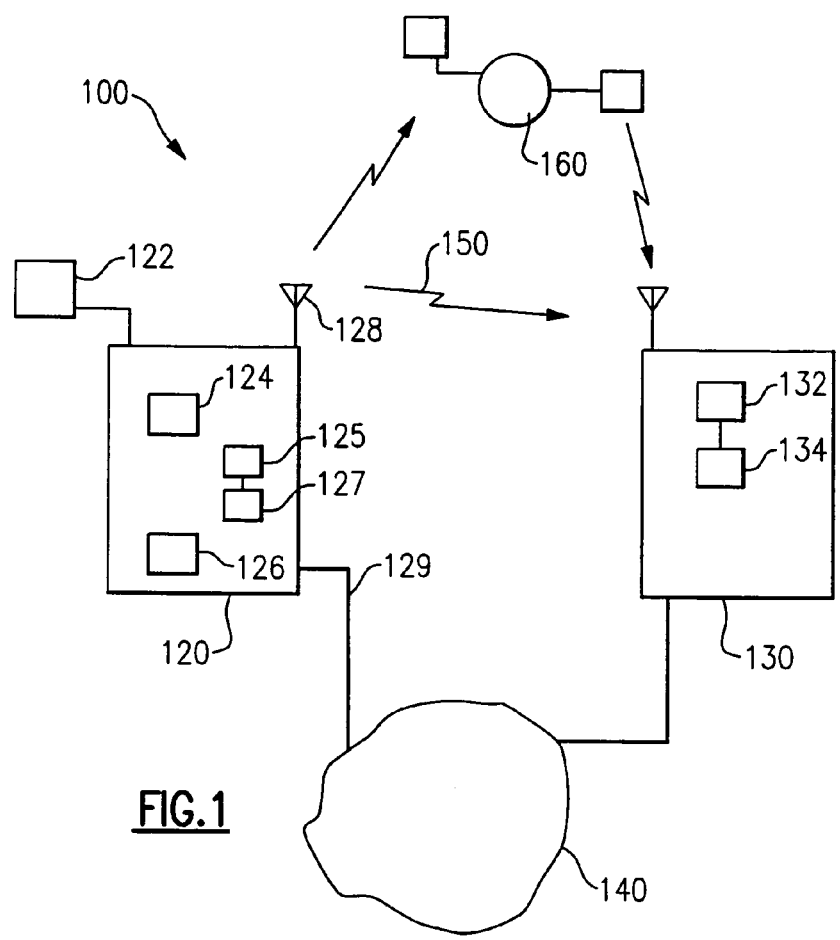
FIG.1
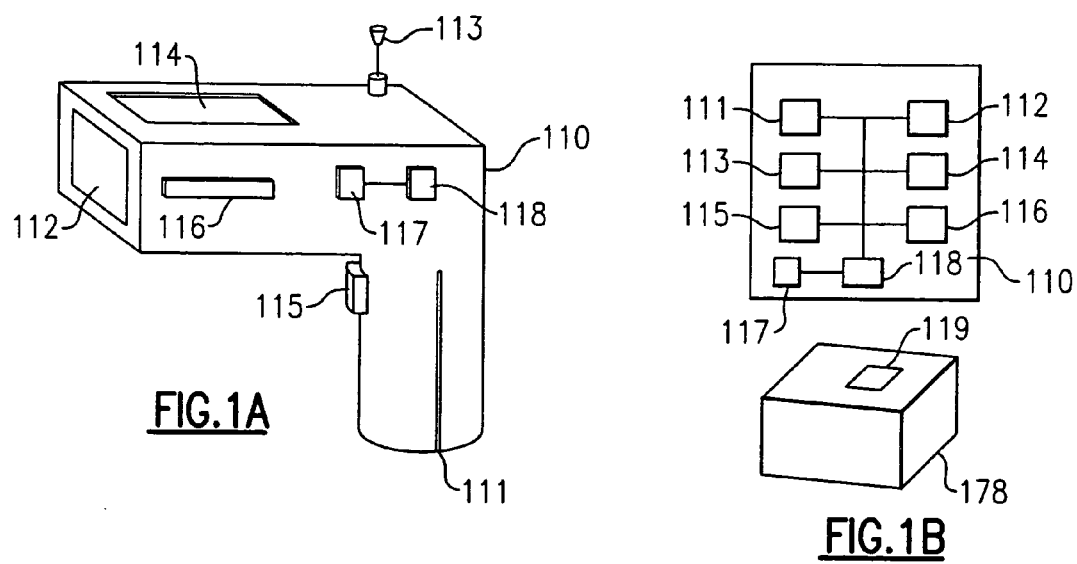
FIG.1A
FIG.1B

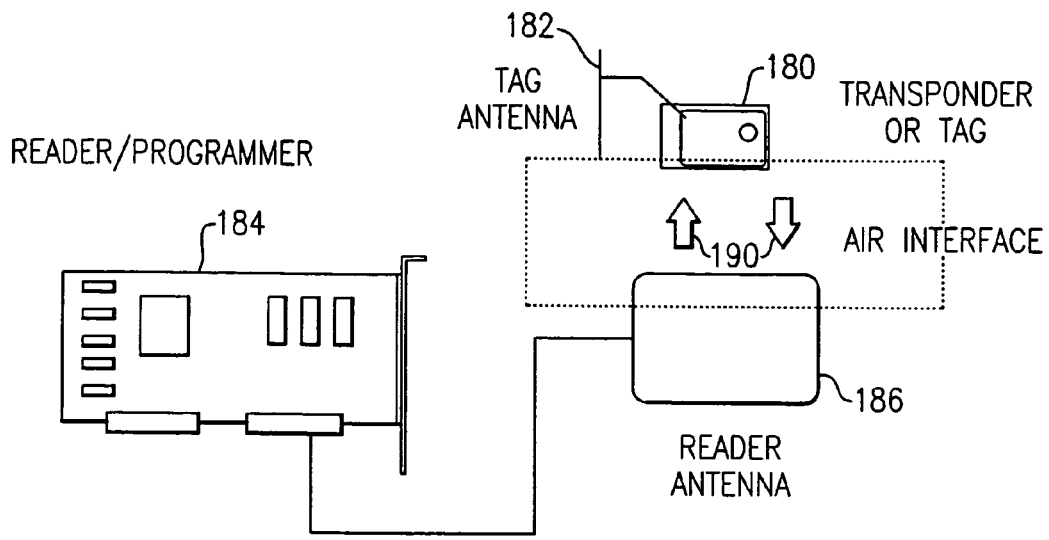
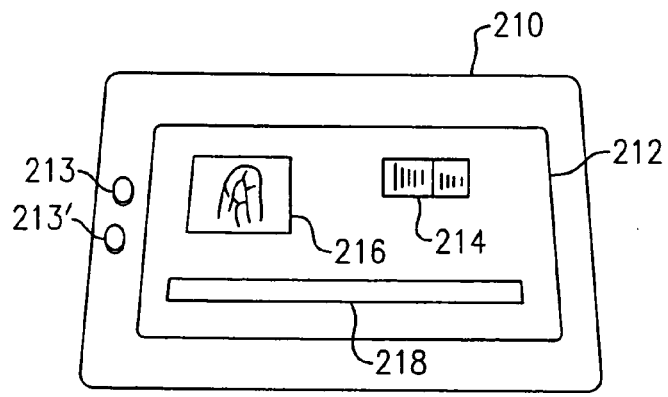
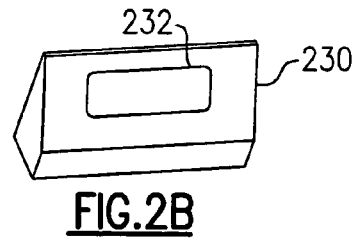
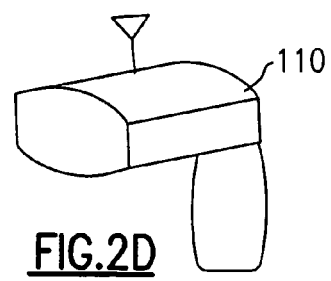
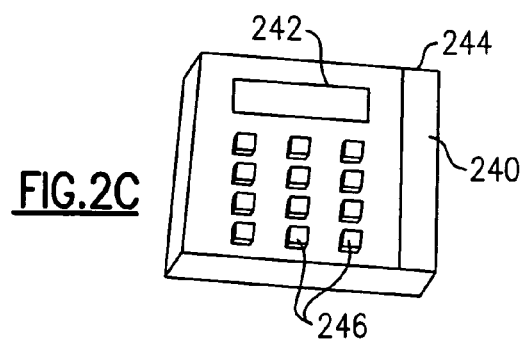

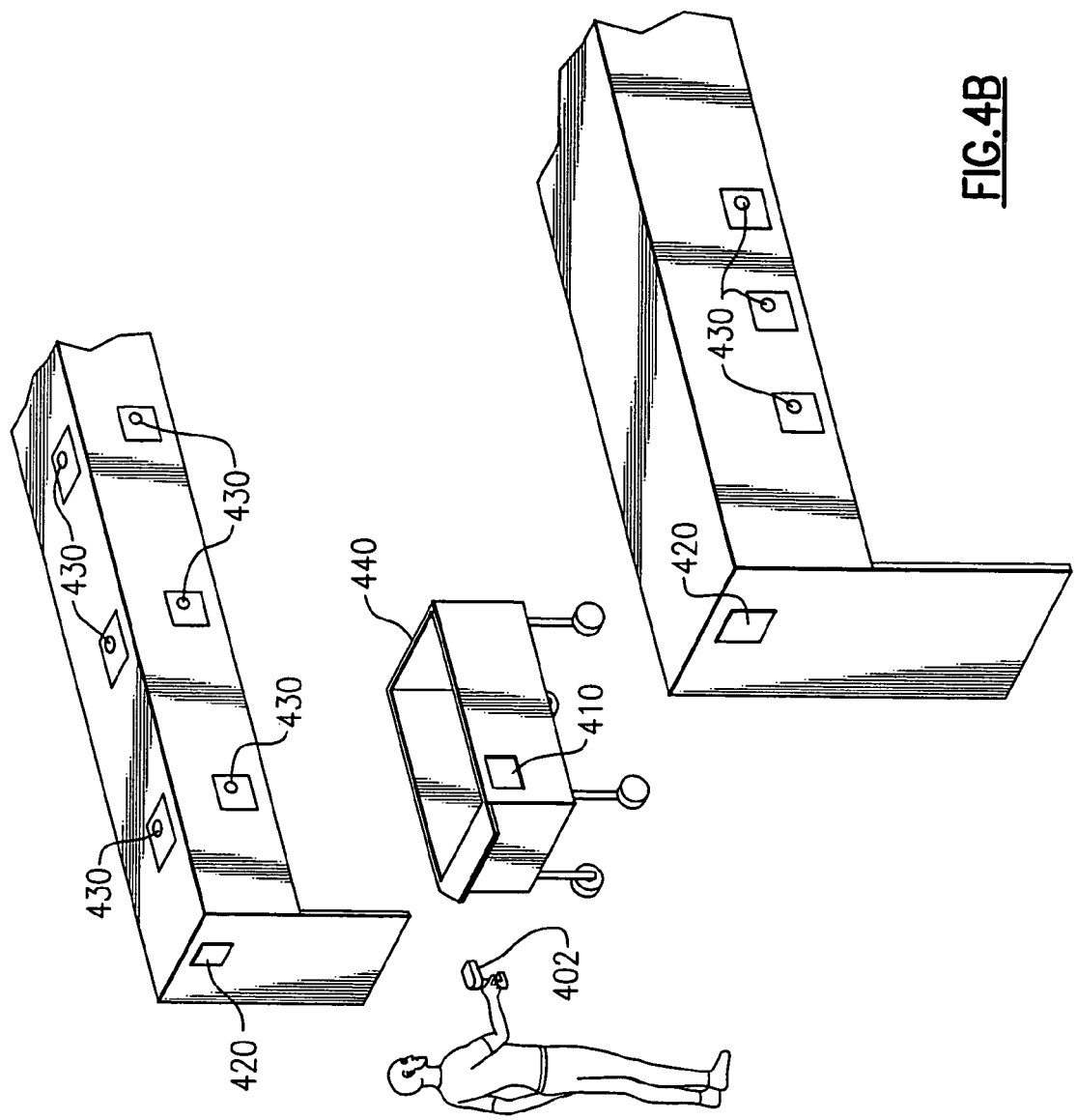
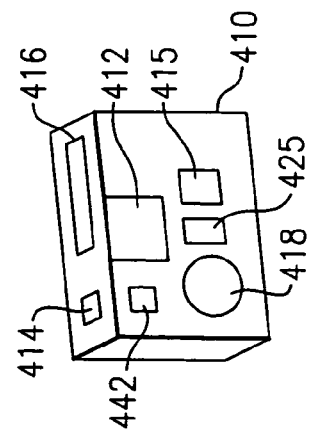

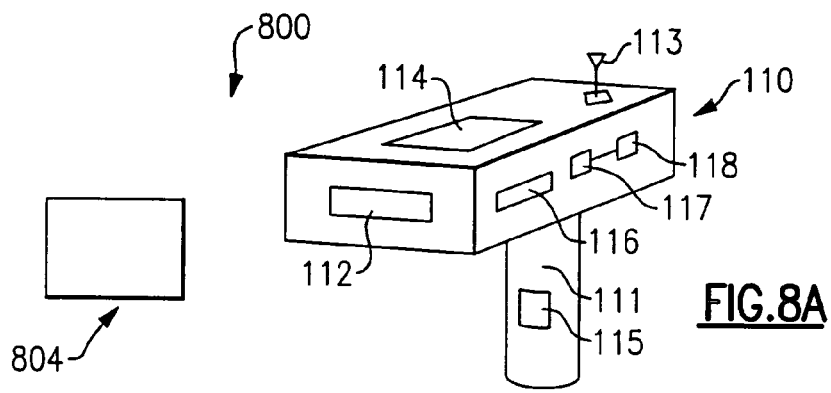
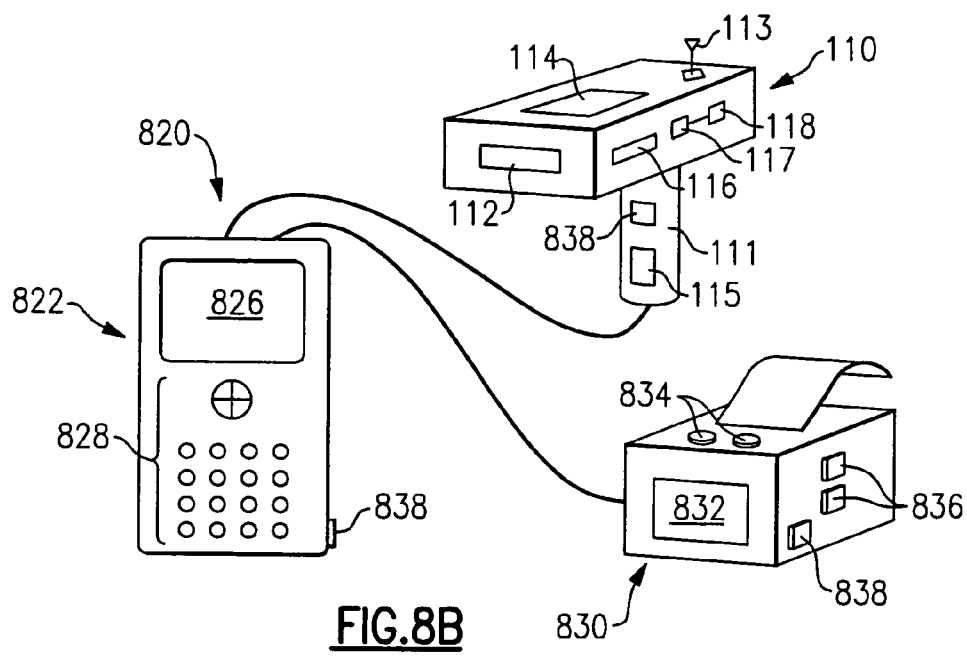
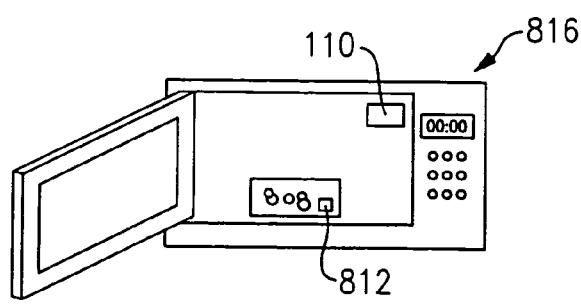
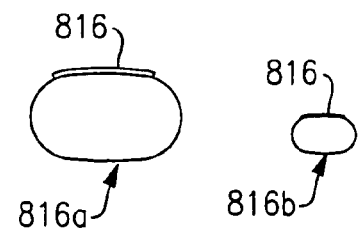

PROXIMITY TRANSACTION APPARATUS AND METHODS OF USE THEREOF

CROSS-REFERENCE TO RELATED APPLICATIONS

None.

FIELD OF THE INVENTION

The invention relates in general to facilitating commercial transactions. In particular the invention relates to the use of radio frequency enabled terminals that use payment tokens in facilitating arbitrary commercial transactions.

BACKGROUND OF THE INVENTION

The use of radio frequency (RF) enabled payment devices are known. One example is the Speedpass™ key fob that is issued by the ExxonMobil™ Corporation. The holder of a Speedpass™ key fob can pay for the purchase of gasoline at an ExxonMobil™ gas station by placing the Speedpass™ key fob in close proximity to a specified portion of the pumping station. Circuitry in the pumping station then extracts payment information from the Speedpass™ key fob and activates the pump for operation. The payment information is used to charge the purchase to the holder's account that is maintained with the ExxonMobil™ Corporation. Another example of a RF enabled payment device is a RF highway toll payment device, such as the FastLane™ payment device issued by the Massachusetts Turnpike Authority (MTA) for use on toll roads associated with the MTA, or the E-ZPass™ payment device issued by the New York State Thruway Authority. With the highway toll payment device present in a vehicle, a user can pass through a toll booth without being required to stop or provide immediate payment in cash against a toll ticket. Each time a user passes through a toll booth, a RF reading device extracts user identification information from the highway toll payment device. This user identification information is used to charge an account maintained with the issuer for each toll incurred.

While current RF enabled payment devices provide some convenience for the purchase of certain goods or services from certain providers, significant disadvantages in their operation remain. For example, the Speedpass™ key fob and the FastLane™ payment device can only be used to conduct transactions with the specific entities associated with their respective issuers, i.e., ExxonMobil™ gas stations and MTA toll booths (or other affiliated toll roads). Further, the commercial or financial transactions available for use with the Speedpass™ key fob and the FastLane™ payment device are limited. In particular, only the goods that are available at an ExxonMobil™ gas station can be purchased with the Speedpass™ key fob and only payment of tolls for roadway travel on affiliated toll roads can be achieved with the FastLane™ payment device.

There is a need for a RF payment device and system that provides greater convenience and flexibility to a user.

SUMMARY OF THE INVENTION

In one aspect, the invention relates to a terminal for conducting an ad libitum financial transaction intermediated by a payment token. The terminal comprises a radio frequency reader. The reader is configured to read a radio frequency payment token presented as a payment medium for the ad libitum financial transaction. The radio frequency reader is devoid of a capability to simulate a reader employing reader technology other than radio frequency. The terminal also comprises an output device for confirming that a transaction is being performed.

In one embodiment, the terminal further comprises a transaction register. In another embodiment, the terminal is operated by a salesperson. In an additional embodiment, the terminal further comprises a printer. In yet another embodiment of the terminal, the printer is configured to print a transaction receipt. In yet an additional embodiment, the terminal further comprises an imaging device. In still another embodiment, the imaging device is a bar code reader.

In another aspect, the invention relates to a terminal for conducting a financial transaction. The terminal comprises a radio frequency reader. The reader is configured to read a selected one of a plurality of payment tokens employing dissimilar data formats. The terminal is also configured to provide data corresponding to an elicited response from the selected one of a plurality of payment tokens employing dissimilar data formats. The terminal also comprises a memory for recording data and a machine-readable program. The memory is in communication with the radio frequency reader. The terminal further comprises a communication module in communication with the radio frequency reader and the memory. The communication module is configured to communicate bidirectionally with a remote computer-based apparatus. The terminal additionally comprises a processor module in communication with the memory and the radio frequency reader. The processor module is configured by the machine-readable program to attempt to decode the data corresponding to the elicited response. In operation in response to an indication that the processor module is not configured to perform the decoding correctly, the communication module is configured to request from the remote computer-based apparatus at least one machine-readable instruction for properly configuring the processor module to decode the data.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 1 illustrates in overview an exemplary embodiment of a proximity transaction apparatus, according to principles of the invention;

FIG. 1A illustrates an embodiment of a hand held, portable proximity device, according to the invention;

FIG. 1B illustrates an RFID tag with an associated object;

FIG. 1C illustrates the basic features of an RFID transponder, as shown in the prior art;

FIGS. 2A-2D illustrate exemplary embodiments of an RFID tag or SmartCard comprising a plurality of technologies and embodiments of readers useful according to principles of the invention;

FIGS. 4A and 4B illustrate exemplary embodiments of an RFID amplifier according to principles of the invention;

FIG. 8A illustrates an exemplary embodiment of proximity device configuration system according to the principles of the invention.

FIG. 8B illustrates an exemplary embodiment of a system for storing and updating device related information according to the principles of the invention.

FIG. 8C illustrates an exemplary embodiment of a system for automatically configuring devices according to the principles of the invention.

FIG. 8D illustrates exemplary embodiments of RFID information and access tags according to the principles of the invention.

DETAILED DESCRIPTION OF THE INVENTION

Figure 3:
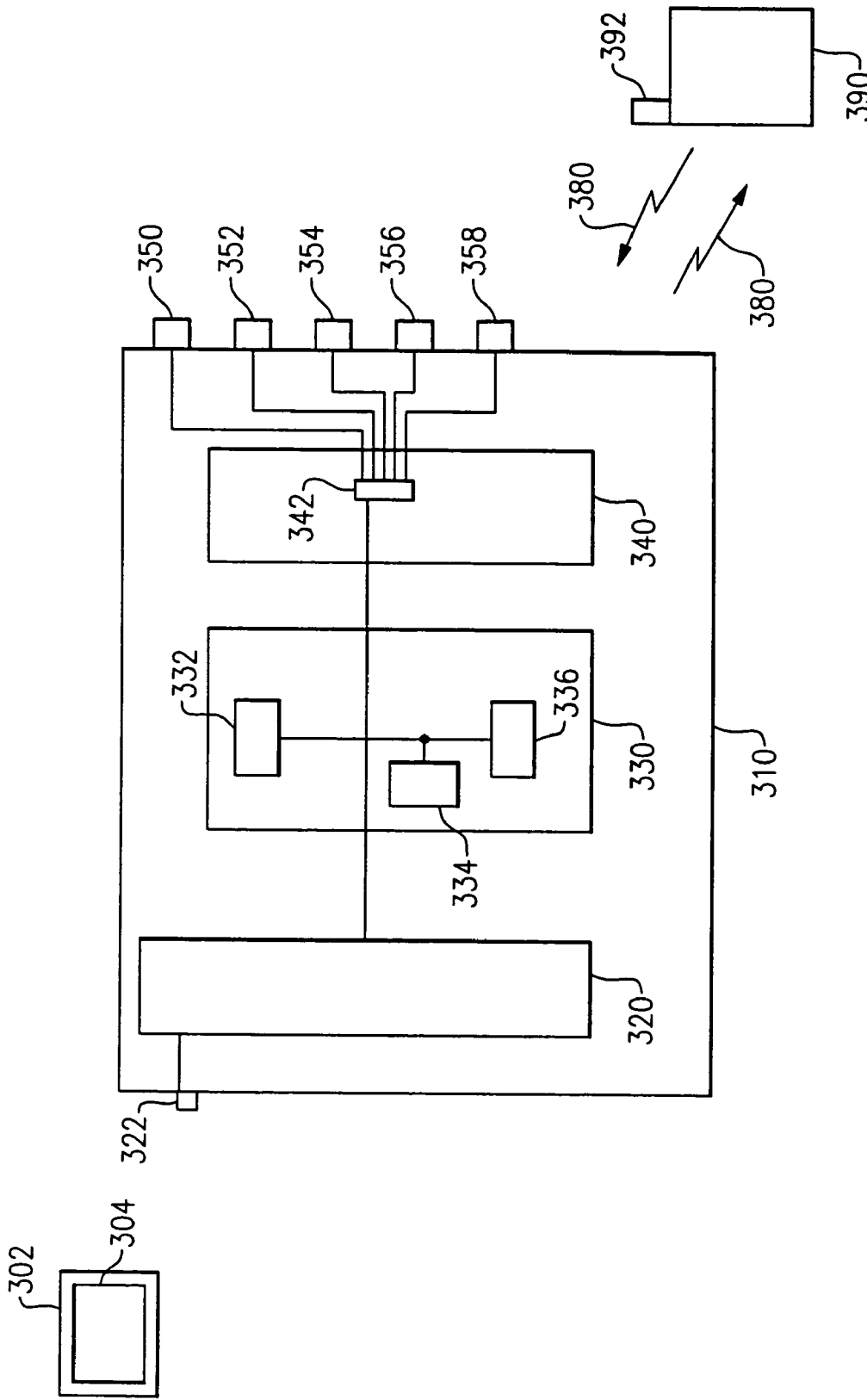
FIG. 3 illustrates exemplary embodiments of an RFID converter according to principles of the invention.

The invention relates to apparatus and methods useful in the conduct of business in a business establishment, where customers come to purchase goods and/or services. Examples include sellers of goods, such as supermarkets, retail, and department stores, businesses that vend equipment, parts, and services, such as automobile dealerships, and convenience stores and service businesses, such as movie theaters, sports franchises, restaurants, and medical offices. The invention can also be practiced in non-commercial environments, such as hospitals, where databases of records and information are stored and accessed. Additionally the invention can be used to facilitate the interaction among electronic devices, or between an object that is substantially non-electronic in nature and an electronic device.

Turning to FIG. 1, a proximity transaction system 100 of the invention is depicted in overview. A proximity device 110 comprises a data acquisition portion that can include one or more of: an optical imaging device 112, such as an electronic camera or a similar CCD or CMOS imaging array; a radio frequency interrogator/reader (RF I/R) 114, for example an ISO/IEC 14443 compliant interrogator/reader; a magnetic symbol reading device 111; an electrical connector 116 having sufficient electrical contacts to communicate electrically with an integrated circuit card (such as an IC card, a "Smart Card," a PCMCIA card, a PC card), or with a contact or contactless RFID tag 119 which can include a memory; and a microprocessor 118 in electrical communication with each of the optical imaging device 112, the RF I/R 114, the magnetic reading device 111, and with a memory 117 associated with the microprocessor 118. The proximity device 110 is shown in schematic form, and can be a stationary or portable device. For example, a hand held, portable proximity device 110 is shown in FIG. 1A, wherein each of the components of the schematic proximity device 110 is shown in the portable proximity device 110 by the same numeral. In FIG. 1B, the RFID tag 119 is depicted as being attached to an object 175. In various embodiments, the RFID tag 119 is contained in a transaction card that can be used for a variety of financial and non-financial transactions. As will be understood the transactions enabled by the transaction card can include the exchange and/or querying of data. In some embodiments, the RF I/R 114 also has the ability to write information to the RFID tag 119.

In some embodiments, the proximity device comprises a switch 115, which can be a manually activated switch such as a trigger configured for use by an operator, a pressure-activated switch, such as a scale, configured to be activated when an object comes in contact therewith, or a switch activated by an electronic signal, an optical signal, or an auditory signal. The switch 115 when present is in electrical communication at least with the microprocessor 118.

In some embodiments, the proximity device 110 comprises a communication device 113. The communication device 113, when present, is at least in electrical communication with the microprocessor 118. In some embodiments, the communication device 113 is a wireless bi-directional communication device such as a radio or infrared transmitter/receiver that operates according to any of the 802.11 standard communication protocols or other standard protocols such as USB. In other embodiments, the communication device 113 is a transmitter/receiver, such as a modem, having a wired connection to another device, such as a local point of sale terminal 122, and operating according to any conventional data communication protocol. The communication device 113 in a hard-wired embodiment can be a circuit switched device or a packet switched device, as are well known in the data communication arts. In some embodiments, the proximity device 110 comprises acoustic input and output devices, such as a microphone and speaker, and the communication device 113 is capable of communicating voice signals as well as data, for example, according to the Voice-over-Internet Protocol (VoIP).

The proximity device 110 is able to read a wide variety of information from diverse sources. For example, the optical imaging device 112 can be designed to collect optical, infrared, or ultraviolet electromagnetic signals, depending on the composition of lenses and materials of construction of the imaging sensor thereof. For example, a silicon sensor operating with common plastic or glass lenses can detect signals in the visible region of the electromagnetic spectrum. A gallium arsenide or other III-V compound semiconductor sensor operating with quartz optics can detect signals in the ultraviolet. Infrared sensors, such as the IMD series of pyroelectric infrared sensors available from Murata Manufacturing Company, Ltd., of Tokyo, Japan, can be used to detect the presence of infrared signals.

In embodiments wherein the optical imaging device 112 is an electronic camera or a CCD or CMOS array, the signals obtained from the optical imaging device can be decoded with a suitably programmed computer or microprocessor, and can represent many different kinds of information. For example, it is well known in the optical imaging arts that light reflected from objects and converted to electrical signals can be decoded to reveal the presence, and the information content, of one dimensional bar codes, two dimensional bar codes, OCR fonts, characters and numeral that are handwritten, typed and/or printed, biometric indicators such as retinal patterns, and predefined patterns including specific regions thereof, such as shipping labels and bank checks. Other embodiments that can potentially be used with the current radio frequency based technology include those described in one or more of: U.S. Utility patent application Ser. No.

10/044,137, filed Jan. 11, 2002, entitled "Transaction Terminal Encryption Apparatus Comprising Encryption Mode Indicator;" U.S. Utility patent application Ser. No. 10/252,227, filed Sep. 23, 2002, entitled "Transaction Terminal Including Imaging Module;" U.S. Utility patent application Ser. No. 10/339,444, filed Jan. 9, 2003, entitled "Transaction Terminal Comprising Imaging Module;" U.S. Provisional Patent Application Ser. No. 60/538,958, filed Jan. 23, 2004, entitled "System and Method to Store and Retrieve Indicia Associated Information Content;" U.S. Utility patent application Ser. No. 10/819,655, filed Apr. 7, 2004, entitled "HTTP Enabled Computer Peripheral;" and U.S. Utility patent application Ser. No. 10/819,616, filed, Apr. 7, 2004, entitled "Routing Device And Method For Use With A HTTP Enabled Computer Peripheral," all of which applications are incorporated herein by reference in their entirety.

In some embodiments, the radio frequency interrogator/reader (RF I/R) 114 is an ISO/IEC 14443 compliant RFID interrogator and reader that can interrogate an RFID contactless device and that can recover the response that an RFID tag 119 emits. The International Organization for Standardization (ISO) and the International Electrotechnical Commission (IEC) are bodies that define the specialized system for worldwide standardization. In other embodiments, the radio frequency interrogator/reader 114 operates in accordance with ISO/IEC 10536, or ISO/IEC 15963. Contactless Card Standards promulgated by ISO/IEC cover a variety of types as embodied in ISO/IEC 10536 (Close coupled cards), ISO/IEC 14443 (Proximity cards), and ISO/IEC 15693 (Vicinity cards). These are intended for operation when very near, nearby and at a longer distance from associated coupling devices, respectively. In some embodiments, the radio frequency interrogator/reader 114 is configured to read tags that comprise information recorded in accordance with the Electronic Product Code (EPC), a code format proposed by the Auto-ID Center at MIT. EPC is described in more detail herein below. In some embodiments, the radio frequency interrogator/reader 114 operates according to a proprietary protocol. In some embodiments, the radio frequency interrogator/reader 114 communicates at least a portion of the information received from an interrogated RFID tag to a computer processor that uses the information to access or retrieve data stored on a server accessible via the Internet. In some embodiments, the information is a serial number of the RFID tag or of the object associated with the RFID tag.

In some embodiments, the magnetic symbol reading device 111 is a magnetic stripe reader capable of reading objects such as cards carrying information encoded in magnetic format on one or more tracks, for example, the tracks used on credit cards. In other embodiments, the magnetic reading device is a magnetic character reading device, for reading characters printed using magnetic ink, such as is found on bank checks to indicate an American Bankers Association routing number, an account number, a check sequence number, and a draft amount. In some embodiments, both types of magnetic reading devices are provided.

A point of sale terminal 122 is optionally a part of the system shown in FIG. 1. The point of sale terminal 122, when present, is in communication with a local financial transaction system 120. In some embodiments, the point of sale terminal 122 is a cash register or a computer with an associated cash drawer and display. In some embodiments, the point of sale terminal 122 is operated by a cashier. In some embodiments, the point of sale terminal 122 is not provided, and the user of the proximity transaction system 100 (otherwise referred to herein as the customer or the purchaser) conducts a transaction without assistance from a cashier or other employee of a vendor. In such a circumstance, the proximity device 110 communicates directly with the local financial transaction system 120, by hard-wired or by wireless communication technology. As will be understood, the proximity device 110 is typically operated by a cashier when a cashier is present, is operated by a purchaser when no cashier is present, and can optionally be operated by the purchaser when a cashier is present.

In some embodiments, the local financial transaction system 120 comprises a display 124, such as a computer monitor or video screen. In some embodiments, the local financial transaction system 120 comprises a printer 126, for generating a paper document, such as a receipt or bill of goods, to be presented to the customer for the customer's records, and/or to be used as evidence of a completed transaction permitting the customer to remove purchased goods from the business premises. The local financial transaction system 120 comprises a central processing unit (CPU) 125 and a memory 127 in communication with the CPU 125. In some embodiments, the CPU 125 is a microprocessor-based integrated circuit comprising a memory 127.

The local financial transaction system 120 maintains a local database. The local database comprises information useful in operating the business. Examples of information useful in running a business can include maintaining a record of sales volume as a function of time; maintaining a running total of inventory of particular items offered for sale; maintaining and updating a price list; maintaining data relating to special offers (e.g., discounts for members of particular groups, such as senior citizens, members of an affinity group, bearers of discount coupons, or volume purchasers); and recording data relating to the purchasing history of a purchaser, such as the maintenance record of a vehicle. Any other information that can be useful in operating the business is contemplated herein as being appropriate for such a local database.

The local financial transaction system 120 comprises communication technology for bi-directionally exchanging information with a central financial transaction system 130. The bi-directional communication technology can be any of hard-wired communication by a hard-wired (e.g., a medium such as electrical wire and optical fiber) connection 129 through a switching system 140 such as the telephone system or the internet, and a wireless communication system 128, such as by electromagnetic transmission using radio 150 or via communication satellite 160, as well as a system that comprises both hard-wired and wireless links.

The central financial transaction system 130 comprises a central processing unit 132 and a data repository 134, such as a computer and associated memory. The central financial transaction system 130 is some embodiments is more than one central processing unit, and more than one data repository, for example, a network of computers that communicate among themselves, such as is found in the interconnection of local banks and the central banking system/financial settlement system of a country. In general, the central financial transaction system 130 is understood in the context of the present invention to represent that portion of the financial system that maintains accounts of credits and debits (e.g., banks, credit card issuers) and that receives from a vendor facility a notification of a transaction, including any or all of a transaction amount, an account identifier of a purchaser, an account identifier of a vendor, a time of the transaction taking place, and as needed, confirmatory information, such as a password, a personal identification number (PIN), or biometric information, useful to assure the authenticity of the purchaser and/or his or her authority to conduct the transaction.

Optionally, the systems have a keypad or keyboard for entry of data by a user, for example for entry of a PIN or other identification or identity confirmation information.

In one embodiment, the invention utilizes information recorded in the form of electronic product codes (EPCs). A manufacturer will be assigned EPCs for its products by an entity authorized to assign codes, such as AutoID Inc., a joint venture set up by the Uniform Code Council and EAN International to commercialize the technology. The manufacturer registers its company code and product identifiers (numbers associated with particular SKUs) with a provider of the internet-based data storage service, such as the Object Name Service (hereinafter ONS) provided by VeriSign. The provider of the internet-based data storage service associates the company code and SKU number with an Internet Protocol (hereinafter "IP") address, or with a URL, that is replicated through the ONS. When a tag is scanned, ONS provides an address for computers to use to locate and access a server where the information is stored.

In one embodiment, product information associated with a company code and product identifier is stored in Product Markup Language (hereinafter "PML"), a variant of the World Wide Web's Extensible Markup Language (XML). PML files are stored on servers, which are referred to as EPC Information Services or PML servers. In some embodiments, PML files are hosted on secure servers, which can authenticate users and provide access to information based on classes defined by customers. For example, a manufacturer might want to make some product information available to logistics partners, but not to suppliers or to competitors. In some embodiments, a server at a first location can hold a directory of the locations of other servers hosting product information, so that initial inquiries from entities authorized to view information can be transmitted to a single server and redirected therefrom to the server holding the information, rather than requiring a plurality of server addresses to be interrogated to find the information.

The EPC is a unique number that identifies a specific item in the supply chain. The EPC is stored on a radio frequency identification (RFID) tag, which combines a silicon chip and an antenna. Once the EPC is retrieved from the tag, it can be associated with dynamic data such the origin of an item (e.g., the facility or location where the item was made) or the date of its production. The EPC is similar to a Global Trade Item Number (GTIN) or Vehicle Identification Number (VIN), in that it identifies a specific item, including the manufacturer of the item, a sequential number representing the order in which the item was manufactured, and various attributes of the item.

The EPCglobal Network uses radio frequency identification (RFID) technology to enable information about items in the supply chain to be available for retrieval, viewing and use. The network is comprised of five fundamental elements: the Electronic Product Code (EPC), the ID System (EPC Tags and Readers), the Object Name Service (ONS), the Physical Markup Language (PML), and Savant. The ONS tells the computer systems where to locate information on the network about the object carrying an EPC, such as when the item was produced. Physical Markup Language (PML) is used as a common language in the EPCglobal Network to define data on physical objects. Savant is a technology implemented in software that acts as the central nervous system of the EPC-global Network. Savant manages and moves information in a way that does not overload existing corporate and public networks.

EPC tags enable automatic, non-line-of-sight identification. It is expected that bar codes, such as those used to represent Universal Product Codes (UPC codes), and EPC tags will co-exist in commerce for a considerable time. More complex bar codes, such as two-dimensional (2D), which can encode considerable amounts of information in compact format, can provide as much or more information than an EPC tag. However, EPC tags that comprise re-writeable memory can have applications that are difficult to implement using a static coding of information. In another embodiment, electronic tags that comprise sensors, such as a temperature sensor, an accelerometer, a pressure sensor, or a stress sensor, can provide information about the environmental conditions experienced by an object. A time capability can also be provided to allow recording a chronological record or history.

At present, it is prohibitively expensive to put an EPC tag on every bottle, can, box, or bag of product in commerce. However, as prices of tags moderate, it is foreseeable that the time will come that such individualized tags will be practical for products costing modest amounts of money. At an intermediate point in time, a tag that identifies a plurality of interchangeable objects in a single lot or batch will be economically meaningful, such as a tag on a pallet or shipping container comprising a plurality of examples of an undifferentiated product such as cans of corn. EPC tags are expected to support both the reading of information from the tag and the writing of information to a tag. It is foreseeable that EPC tags will allow a tagged object to carry information that can be updated or augmented as the object travels from location to location, is manipulated (for example by being inspected, subjected to maintenance, or otherwise modified), or is combined with or used with other objects. As an example, an EPC tag could include instructions for use of the object, a maintenance record, and a list of components, for example parts or software that the object comprises. Over time, the EPC tag can be rewritten to record additions or deletions of components, such as updated software, and modifications of the methods of use of the object, for example instructions that optimize the use of the new software. It is expected that the EPC tag can further include records of when the object was last serviced or tested for appropriate performance. Having such information attached to the object itself can help to make the object more convenient to use.

RFID Overview

The AIM, Inc. White Paper entitled "Radio Frequency Identification—RFID A basic primer" (Document Version: 1.11, and having a publication date of Sep. 28, 1999) incorporated herein by reference in its entirety provides an overview of some of the basic aspects of RFID systems. The following description is an edited excerpt from the document. In general the exchange of data between tags and readers, such as the proximity device 110, is by wireless communication and two methods distinguish and categorize RFID systems. One method is based on close proximity electromagnetic or inductive coupling (e.g., the use of evanescent waves over distances short by comparison with a wavelength of the wave) and one is based on propagating electromagnetic waves. Coupling is via antenna structures forming an integral feature in both tags and readers. While the term antenna is generally considered more appropriate for propagating systems it is also loosely applied to inductive systems.

In RFID systems, transmitting data is subject to the vagaries and influences of the media or channels through which the data has to pass, including the air interface. Noise, interference and distortion are the sources of data corruption that arise in practical communication channels that must be guarded against in seeking to achieve error free data recovery. Moreover, asynchronous data communication processes require attention to the form in which the data is communicated. Channel encoding involves structuring the bit stream to accommodate these needs. The coding scheme applied appears in system specifications, and generally is transparent to the user of a RFID system. Various encoding schemes can be distinguished, each exhibiting different performance features.

The data is superimposed on a sinusoidally varying field or carrier wave to transfer data efficiently between the two communicating components. The superimposition process is referred to as modulation. Various schemes are available for this purpose, each having particular advantages. All of the schemes are based on changing the value of one of the primary features of an alternating sinusoidal source, such as its amplitude, frequency or phase in accordance with the data carrying bit stream. On this basis one can distinguish amplitude shift keying (ASK), frequency shift keying (FSK) and phase shift keying (PSK).

In addition to non-contact data transfer, wireless communication can also allow non-line-of-sight communication. However, with very high frequency systems more directionality is evident and can be tailored to needs through appropriate antenna design.

Carrier Frequencies

In wired communication systems the physical wiring constraints allow communication links and networks to be effectively isolated from each other. The approach that is generally adopted for radio frequency communication channels is to separate on the basis of frequency allocation. Generally covered by government regulation, different sections of the electromagnetic spectrum are assigned to different purposes. Three frequency ranges are generally distinguished for RFID systems, low, intermediate (medium) and high. Table 1 summarizes these three frequency ranges, along with the typical system characteristics and examples of major areas of application.

TABLE 1

Frequency Bands and Applications (from AIM White Paper)

| Frequency Band | Characteristics | Typical Applications |
| --- | --- | --- |
| Low<br>100-500 kHz | Short to medium read range<br>Inexpensive<br>low reading speed | Access control<br>Animal identification<br>Inventory control<br>Car immobiliser |
| Intermediate<br>10-15 MHz | Short to medium read range<br>potentially inexpensive<br>medium reading speed | Access control<br>Smart cards |
| High<br>850-950 MHz<br>2.4-5.8 GHz | Long read range<br>High reading speed<br>Line of sight required<br>Expensive | Railroad car monitoring<br>Toll collection systems |

Data Transfer Rate and Bandwidth

Choice of field or carrier wave frequency is of primary importance in determining data transfer rates. In practical terms the rate of data transfer is influenced primarily by the frequency of the carrier wave or varying field used to carry the data between the tag and its reader. Generally speaking the higher the frequency the higher the data transfer or throughput rates that can be achieved. This is intimately linked to bandwidth or range available within the frequency spectrum for the communication process. According to the Nyquist Theorem, the channel bandwidth needs to be at least twice the bit rate required for the application in mind. Where narrow band allocations are involved the limitation on data rate can be an important consideration. It is clearly less of an issue where wide bandwidths are involved. Using the 2.4-2.5 GHz spread spectrum band, for example, 2 megabits per second data rates may be achieved, with added noise immunity provided by the spread spectrum modulation approach. Spread spectrum apart, increasing the bandwidth allows an increase noise level and a reduction in signal-to-noise ratio. Since it is generally necessary to ensure a signal is above the noise floor for a given application, bandwidth is an important consideration in this respect.

Range and Power Levels

The range that can be achieved in a RFID system is essentially determined by the power available at the reader/interrogator to communicate with the tag(s), the power available within the tag to respond, and the environmental conditions and structures, the former being more significant at higher frequencies including signal to noise ratio.

Although the level of available power is the primary determinant of range, the manner and efficiency in which that power is deployed also influences the range. The field delivered from an antenna extends into the space surrounding it and its strength diminishes with respect to distance. The antenna design will determine the shape of the field or propagation wave delivered, so that range will also be influenced by the angle subtended between the tag and antenna. Directional antennas may be used if the orientation between a tag and a reader will be known. The energy requirement for a directed beam to be read and understood is in general significantly lower than for an omnidirectional beam operating over the same distance. However, in many instances omnidirectional antennas will be needed because there is no way, a priori, to know how a tag and a reader will be aligned. In some instances, an antenna system that sweeps a beam of energy over an arc or angular range may be a good compromise.

As is commonly known in a space free of any obstructions or absorption mechanisms, the strength of a field reduces in inverse proportion to the square of the distance. For a wave propagating through a region in which reflections can arise from the ground and from obstacles, the reduction in strength can vary considerably, in some cases as an inverse fourth power of the distance. The phenomenon known as "multipath attenuation" arises when there are different paths due to reflections and absorptions. At higher frequencies absorption due to the presence of moisture can further influence range. It is therefore important in many applications to determine how the environment, internal or external, can influence the range of communication.

In general the power available to the tag is significantly less than that available to the reader. This means that sensitive detection capabilities are useful within the reader to handle the return signals. In some systems the reader constitutes a receiver and is separate from the interrogation source or transmitter, particularly if the 'up-link' (from transmitter-to-tag) carrier is different from the 'down-link' (from tag-to-reader).

Basic features of an RFID transponder and its interaction with a reader/programmer are described in the AIM, Inc. White Paper entitled "Radio Frequency Identification—RFID A basic primer" (Document Version: 1.11, and having a publication date of Sep. 28, 1999), which has already been incorporated herein by reference. For example, a figure from that paper is reproduced here as FIG. 1C for the convenience of the reader. FIG. 1C depicts an RFID tag or transponder 180 with an antenna 182, a reader/programmer 184 in the form of a card designed to be installed in an expansion slot of a personal computer, and an antenna 186 attached to the reader/programmer 184. Interaction between the reader/programmer 184 and the tag 180 is shown as occurring across an air interface, and can be bi-directional, as indicated by the arrows 190.

The transponder can include memory, which memory can comprise any one or more of read-only (ROM), random access (RAM) and non-volatile programmable memory for data storage, depending upon the type and sophistication of the device. The ROM-based memory can be used to accommodate security data and the transponder operating system instructions which, in conjunction with the processor or processing logic deals with the internal management functions such as response delay timing, data flow control, and power supply switching. The RAM-based memory can be used to facilitate temporary data storage during transponder interrogation and response.

Non-volatile programmable memory may take various forms, electrically erasable programmable read only memory (EEPROM) being typical. Non-volatile memory can be used to store the transponder data. In some embodiments, non-volatile memory is used to ensure that the data is retained when the device is in its quiescent or power-saving "sleep" state. Some memory types, such as magnetic bubble memory, are inherently non-volatile.

Data buffers are further components of memory, used to temporarily hold incoming data following demodulation and outgoing data for modulation and interface with the transponder antenna. The interface circuitry provides the facility to direct and accommodate the interrogation field energy for powering purposes in passive transponders and triggering of the transponder response. Where programming is accommodated, facilities must be provided to accept the data modulated signal and perform the necessary demodulation and data transfer processes.

The transponder antenna is the structure by which the device senses the interrogating field and, where appropriate, the programming field and also serves as the means of transmitting the transponder response to interrogation.

A number of features, in addition to carrier frequency, characterize RFID transponders and form the basis of device specifications, including: the source of the transponder power, the transponder data carrying options, data read rates, programming options, and physical form.

Powering tags—For tags to work they require power, albeit at a relatively low level (e.g., microwatts to milliwatts). Tags are either passive or active, the designation being determined entirely by the manner in which the device derives its power.

Active tags are powered by an internal battery and are typically read/write devices. They usually contain a cell that exhibits a high power-to-weight ratio and are usually capable of operating over a temperature range of −50° C. to +70° C. The use of a battery implies that a sealed active transponder has a finite lifetime. However, a suitable cell coupled to suitable low power circuitry can ensure functionality for as long as ten or more years, depending upon the operating temperatures, read/write cycles and usage. Alternative sources of energy such as solar cells or miniature fuel cells now in development are potentially useful for powering an active tag as the energy requirements of such a tag are relatively modest and easily within the capability of such alternative energy sources. In general terms, active transponders allow greater communication range than can be expected for passive devices, better noise immunity and higher data transmissions rates when used to power a higher frequency response mode.

Passive tags operate without an internal battery source, deriving the power to operate from the field generated by the reader. Passive tags are consequently much lighter than active tags, less expensive, and offer a virtually unlimited operational lifetime. The trade-off is that they have shorter read ranges than active tags and require a higher-powered reader. Passive tags are also constrained in their capacity to store data and may exhibit reduced ability to perform well in electromagnetically noisy environments. Sensitivity and orientation performance may also be constrained by the limitation on available power. Despite these limitations passive transponders offer advantages in terms of cost and longevity. They have an almost indefinite lifetime and are generally lower on price than active transponders.

Data carrying options—Data stored in data carriers invariable require some organization and additions, such as data identifiers and error detection bits, to satisfy recovery needs. This process is often referred to as source encoding. Standard numbering systems, such as UCC/EAN and associated data defining elements can be applied to data stored in tags. The amount of data depends on the application and requires an appropriate tag to meet the need. Categories used to classify data carried by tags includes: identifiers, in which a numeric or alphanumeric string is stored for identification purposes or as an access key to data stored elsewhere in a computer or information management system, and portable data files, in which information can be organized, for communication or as a method or instrument for initiating actions either independently or in combination with data stored elsewhere.

In terms of data capacity, tags are available from single bit to kilobits. The single bit devices can be used for surveillance purposes. Retail electronic article surveillance (EAS) is the typical application for such devices, being used to activate an alarm when detected in the interrogating field. They may also be used in counting applications.

Devices characterized by data storage capacities up to 128 bits can be used to hold a serial or identification number together, possibly, with parity check bits. Such devices may be manufacturer or user programmable. Tags with data storage capacities up to 512 bits, are frequently user programmable, and suitable for accommodating identification and other specific data such as serial numbers, package content, key process instructions or possibly results of earlier interrogation/response transactions.

Tags characterized by data storage capacities of around 64 kilobits may be regarded as carriers for portable data files, although they can be used for any purpose. With still larger capacity it is possible to organize data into fields or pages that may be selectively interrogated during the reading process.

Data read rate—As indicated above, the data transfer rate is essentially linked to carrier frequency. The higher the frequency, generally speaking the higher the transfer rates. It should also be appreciated that reading or transferring the data requires a finite period of time, even if rated in milliseconds, and can be an important consideration in applications where a tag is passing swiftly through an interrogation or read zone.

Data programming options—Depending upon the type of memory a tag contains the data carried may be read-only, write once read many (WORM) or read/write. Read-only tags are invariably low capacity devices programmed at source, usually with an identification number. WORM devices are user programmable devices. Read/write devices are also user-programmable by allowing the user to change data stored in a tag. Portable programmers may be recognized that also allow in-field programming of the tag while attached to the item being identified or accompanied.

Physical Form—RFID tags are typically available in a wide variety of physical forms, shapes sizes and protective housings. For example, animal tracking tags, inserted beneath the skin, can be as small as a pencil lead in diameter and ten millimeters in length. In addition, tags can be screw-shaped to identify trees or wooden items, or credit-card shaped for use in access applications. Anti-theft hard plastic tags attached to merchandise in stores are heavy-duty and have typical dimensions of 120 by 100 by 50 millimeters; other anti-theft tags measure approximately 1.5"×1.5"×0.003" to 0.008" thickness. Among other uses, these rectangular transponders can track commercial products, inter-modal containers, heavy machinery, trucks, railroad cars and the like for maintenance and business analysis and management operations.

The Reader/Interrogator

Readers and interrogators (generally referred herein to as readers) can differ quite considerably in complexity, depending upon the type of tags being supported and the functions to be fulfilled. In general, however, the overall function of a reader is to provide the means of communicating with the tags and facilitating data transfer. Functions performed by the reader include but are not limited to reading data, signal conditioning, parity error checking correction, or the like. Once a signal from a tag has been correctly received and decoded, algorithms may be applied to decide whether the signal is a repeat transmission. In the case that it is, the reader may then instruct the transponder to cease transmitting. This is commonly known as the "Command Response Protocol" and is used to circumvent the problem of reading multiple tags in a short space of time. The use of interrogators in this fashion can be referred to as "Hands Down Polling". An alternative, more secure, but slower tag polling technique is called "Hands Up Polling" which involves the interrogator looking for tags with specific identities, and interrogating them in turn. This is contention management, and a variety of techniques have been developed to improve the process of batch reading. A further approach can use multiple readers, multiplexed into one interrogator.

RF Transponder Programmers

Transponder programmers are the mechanism by which data is delivered to write once, read many (WORM) and read/write tags. Programming is generally carried out off-line, at the beginning of a batch production run, for example.

For some systems, re-programming may be carried out on-line if, for example, the tag is being used as an interactive portable data file within a production environment. In some instances, data may need to be recorded during each process. Removing the transponder at the end of each process to read the previously processed data and to program new data increases processing time and detracts substantially from the intended flexibility of the application. By combining the functions of a reader and a programmer, data may be appended or altered in the transponder as required, without compromising the production line.

The range over which the programming can be achieved is generally less than the read range and in some systems near contact positioning is required. Programmers are also generally designed to handle a single tag at a time.

RFID System Categories

Some categories employing RFID systems include: EAS (Electronic Article Surveillance) systems, portable data capture systems, networked systems, and positioning systems. EAS systems are typically a one bit system used to sense the presence/absence of an item. Retail stores frequently employ EAS systems where each item is tagged and large antenna readers are placed at exits to detect the unauthorized removal of the items.

Portable data capture systems are characterized by the use of portable data terminals with integrated RFID readers. These systems are tolerant to considerable variation in the sources of data read from tags. Typically a hand-held readers/portable data terminal is used to capture data that is then either transmitted directly to a host information management system via a radio frequency data communication (RFDC) link or held for delivery by line-linkage to the host on a batch processing basis.

In one embodiment of the invention, data is read by a portable data terminal, a hand-held proximity reader, or the like and then transmitted via line of sight communication to a reception unit. The line of sight communication can be in the form of a narrowly focused laser transmission. In a further embodiment, reception units are placed on the walls at set intervals so that within, for example, a warehouse or a retail establishment relatively little movement is required to achieve line-of-site communication. The line-of-site communication can happen over short distances (e.g., less than one meter) or up to long distances (e.g., tens of meters). In an additional embodiment, the reception units are able to receive simultaneous communications from a plurality of portable data terminals. In another embodiment, the reception units contain display systems for indicating whether the unit is available to receive transmissions.

Networked systems applications are generally characterized by fixed position readers deployed within a given site and connected directly to a networked information management system. The transponders are positioned on moving or moveable items, or people, depending upon application. However, other configurations are within the scope of this disclosure.

Positioning systems use transponders to facilitate automated location and navigation support for guided vehicles. Readers are positioned on vehicles and are linked to an on-board computer and communication connection to a host information management system. The transponders can be embedded in the floor of the operating environment and can be programmed with identification and location data. The reader antenna is typically located beneath the vehicle to allow closer proximity to the embedded transponders.

Areas of Application for RFID Systems

Potential applications for RFID systems include broad areas of industry, commerce, and services. The attributes of RFID are complimentary to other data capture technologies and thus able to satisfy particular application requirements that cannot be adequately accommodated by alternative technologies. Some of the areas of application for RFID include: transportation and logistics, manufacturing and processing, security, waste management, postal and package tracking, airline baggage reconciliation, road toll management, electronic article surveillance—clothing retail outlets being typical, protection of valuable equipment against theft, unauthorized removal or asset management, controlled access to vehicles, parking areas and fuel facilities—depot facilities being typical, controlled access of personnel to secure or hazardous locations, time and attendance—to replace conventional "slot card" time keeping systems, animal husbandry—for identification in support of individualized feeding programs, automatic identification of tools in numerically controlled machines—to facilitate condition monitoring of tools, for use in managing tool usage and minimizing waste due to excessive machine tool wear, identification of product variants and process control in flexible manufacture systems, sport time recording, electronic monitoring of offenders at home, vehicle anti-theft systems and car immobilizers.

A short overview of EPC technology is presented below. The description of features of the EPC technology is presented in far greater detail in publicly available documents. Version 1.0 of the EPCglobal Network was released in September 2003, and offers a complete set of technical specifications for every component in the EPCglobal Network, including the number system, tag, readers, and reference implementations on many software components. EPCGlobal Version 1.0 Specifications, available at www.epcglobalinc.com/standards_technology/specifications.html, includes: EPC™ Tag Data Standards Version 1.1 Rev. 1.23, a 76 page document dated Feb. 16, 2004, which is available by activating a link on the web page identified in this sentence; a Technical Report entitled "13.56 MHz ISM Band Class 1 Radio Frequency Identification Tag Interface Specification: Candidate Recommendation, Version 1.0.0, a document comprising 31 pages plus front and back covers dated Feb. 1, 2003, which is available by activating a link on the web page identified in this sentence; a 46 page document dated Sep. 5, 2003 entitled "Auto-ID Reader Protocol 1.0" which is available by activating a link on the web page identified in this sentence; a 17 page document dated Aug. 12, 2003 entitled "Auto-ID Object Name Service (ONS) 1.0" which is available by activating a link on the web page identified in this sentence; a 58 page document dated Sep. 1, 2003 entitled "Auto-ID Savant Specification 1.0" which is available by activating a link on the web page identified in this sentence; and a 48 page document dated Sep. 15, 2003 entitled "PLM Core Specification 1.0" which is available by activating a link on the web page identified in this sentence; the entire disclosure of each of which is incorporated herein by reference in its entirety.

In brief, EPC is a tagging technology that provides the capability to identify a very large number of objects in a unique manner. EPC uses a digital identifier having 96 bits. Therefore, EPC in principle can identify $2^{96}$ objects uniquely, or 7.92281625142643 E+28 objects (that is, at least 79,228,162,514,264,300,000,000,000,000, or something greater than 79 billion billion billion objects). The EPC tag is capable of being written to more than once. Therefore, an EPC tag can also include information, possibly in encoded form, about the object associated with the EPC tag, if fewer than all the 96 bits are used to identify the EPC tag and its associated object. Alternatively, an additional memory can be provided, of whatever convenient size, for storing information in association with the object. Memory sizes of at least 64 kilobits are possible. Using technology similar to conventional semiconductor memory, optical memory, or magnetic memory, larger memory sizes are attainable, up to megabit or gigabit capacity. Because a particular object can be identified precisely, and can be addressed individually, an EPC tag makes convenient the tracking, maintaining, upgrading, accounting for, and interacting with a particular object through an electronic tag as compared to the previous marking methods, such as the use of static bar codes, would cause such action to be possible only with great effort.

In some applications, pluralities of technologies including radio frequency identification (RFID), biometrics, and bar codes, can be employed in a single tag or reader. The use of more than one technology can improve the security of a system, in an application such as an Automatic Identification and Data Collection (AIDC) system. Bar code ID cards are considered more secure than photo ID cards without bar codes, and are being implemented for example in drivers' licenses issued by various states. In some embodiments, RFID proximity cards can provide added security. In addition, biometric indicia such as fingerprints, voice prints, retinal scans, are examples of personal information that can be used in combination with bar codes or RFID technology.

The Border Security Act of 2002 mandates biometric information be used in U.S. entry visas, and requires a biometric identifier in new passports. Biometrics are being used in ID cards issued by some U.S. agencies, and by other countries.

RFID technology can be used for many applications in a security system. Examples include controlling access to secure areas; securing, tracking and monitoring assets such as products and equipment; and routing, screening and sorting objects, such as packages. In one example, frequent travelers across the border between the U.S. and Canada can enroll in a program that employs biometrics (i.e., fingerprinting and digital photographs) and RFID technology in an ID card. The system when activated by the RFID proximity tag and the RFID reader displays information about the card holder, including a photo that can be used to identify a person as being permitted entry.

FIG. 2A illustrates exemplary embodiments of an RFID tag or SmartCard comprising a plurality of technologies and of readers useful in applications of the invention. As shown in FIG. 2A, an RFID tag/Smartcard 210 and a reader 110, 230, 240 for such a tag can comprise any one or more of barcodes 214, including 1 and 2 dimensional barcodes, information encoded in magnetic stripes or magnetic ink 218, such as information recorded on swipe cards such as credit and debit cards and information printed on bank checks, biometric information 216, such as a fingerprint, a facial image, a retinal scan, or a voiceprint (whether in visible form, such as a facial image, or in encoded form, such as a retinal scan or voiceprint), an embodiment of RFID technology in any of its forms, illustrated in FIG. 2A by an antenna 212, and Smartcard technology, using at least two electrical contacts 213, 213'. As those of ordinary skill in the art will understand, the RFID and Smartcard technologies require the presence of electronic components not shown in FIG. 2A, but which are well known in the art. The components not shown can comprise circuitry to convert signals between analog and digital formats (A/Ds and D/As), data processing circuitry, data storage media, receiver and transmitter circuitry, and circuitry that performs functions including coding and decoding information, sensing timing, amplitude and phase, formatting messages, and discriminating frequencies. The tag can be passive (i.e. powered by signals from an outside source such as a reader) or active (i.e. powered by an on-board source such as a battery).

As shown in FIGS. 2A-2D, various readers 110, 230, 240 are employed with the RFID/smartcard tag 210. As will be understood by those of ordinary skill in the art, different readers can have different capabilities, and are useful as long as they can read at least one type of information provided by the tag being queried. For example, the reader 110 of FIG. 2D and as described hereinabove can read any of RFID, Smartcard, barcode, and magnetically encoded information. In addition the electronic camera can read other optical symbols, such as optical characters adapted to be recognized by an optical character recognition (OCR) system. The reader 110 can also comprise a wireless communication port, such as an infrared transceiver, that can send and receive information using infrared communication technology. By comparison, reader 230 of FIG. 2B is a reader that comprises fewer reading modalities, for example, only an RFID capability as indicated by loop antenna 232. In a further embodiment, reader 240 of FIG. 2C has both an RFID capability, as indicated by loop antenna 242, and a magnetic stripe reading capability as indicated by slot 244, as well as buttons 246 for use by a person to enter data or commands (as in a menu) by activating one or more buttons 246.

FIG. 3 illustrates exemplary embodiments of an RFID converter 310. An RFID/Smartcard tag 302 including an antenna 304 is shown in a physical orientation such that the RFID converter 310 can communicate with the tag 302. A data processing system 390, having at least one communication port 392, is in communication with the RFID converter 310 through at least one communication port 350 of the RFID converter 310. In some embodiments, the RFID converter 310 comprises a plurality of communication ports 350, 352, 354, 356, 358, and the data processing system 390 uses port 392 to communicated with a selected one of the communication ports 350, 352, 354, 356, 358 of the RFID converter. The data processing system 390 in general is not readily able to communicate directly with the RFID tag 302. For example, the data processing system 390 may not be able to operate with the communication parameters required to communicate directly with an RFID tag 302. In one embodiment, the data processing system 390 can communicate using a communication format selected from one or more of any 802.11 variant, Ethernet (packet based communication), bar code, magnetic stripe reader, RS232, RS488, USB, smartcard, infrared, or laser line of sight communication. In an embodiment wherein a plurality of communication ports 350, 352, 354, 356, 358 are provided in the RFID converter 310, different ones of communication ports 350, 352, 354, 356, 358 are configured to operate according to different communication formats, for example according to one of the above-enumerated formats. The RFID converter 310 takes RFID data from a tag and converts it into an alternative format that is accessible by the data processing system 390, as will be explained hereinbelow. The RFID converter 310 is useful in a RFID or Smart tag reading and processing system. The communication between the RFID converter 310 and the data processing system 390 is at least a unidirectional communication, indicated generally by the arrows 380. Described in general terms, the RFID converter 310 comprises three sections: a transponder section 320, a data manipulation section 330, and an input/output section 340.

The transponder section 320 that communicates with the tag 302 by way of an antenna 322, using a radio frequency and data transmission protocol adapted to the requirements of the RFID tag 302. The transponder section 320 in one embodiment transmits signals calculated to activate an adjacent RFID tag 302, and if no response is received, the transponder section 320 attempts to activate a tag 302 using another frequency and/or protocol. In some embodiments, that transponder 320 cycles through a sequence of frequencies and protocols, searching for tags 302 of one or more types. When a tag 302 is activated and responds, the transponder section receives at the antenna 322 a response signal, which is passed to the data manipulation section 330. The transponder section 320 comprises the electronic components needed to generate and receive radio frequency communications, including circuitry configured to generate/receive one or more radio frequencies, circuitry configured to manage signal timing, including checking for contentions and handling conflicts, recognizing signal formatting and markers indicative of a valid response, and circuitry for controlling the transmission of activation signals.

The data manipulation section 330 comprises subsections. The actions of the data manipulation section will be described in an illustrative manner for data that is flowing from a tag 302 to a data processing system 390, but it will be understood that the data manipulation section 330 is capable of operating bi-directionally. In some embodiments, a data stripping and decoding subsection 332 is provided to extract the information provided by a tag 302 in response to an activating signal from the transponder 320. Based on the frequency and/or protocol for the response, which can be identified by a communication from the transponder 320 to the data manipulation section 330 that indicates the frequency and/or protocol of the activation signal that elicited the response, the data stripping an decoding subsection 332 can perform the necessary manipulation to separate data from carrier signals, and can perform a decoding and organization of the data. The data so identified can in some embodiments be stored in a machine-readable memory 334 for later use. In other embodiments, the data that is decoded and organized is immediately processed without being stored in the memory 334. The data manipulation section 330 comprises data processing hardware 336 such as a microprocessor, a digital signal processor (DSP), an application-specific integrated circuit (ASIC), a programmable logic device (PLD), a field programmable gate array (FPGA), or other digital logic circuit. The data processing hardware 336 controls the decoding and organization of the data. The data manipulation section 330 is in bi-directional communication with the input/output section 340 information that indicates the communication format required for a signal to be communicated to or from the input/output section 340 to the data processing system 390. In some embodiments, at least one instruction in the form of a computer program operating on the data processing hardware 336 directs the data processing hardware 336 to assemble the data in the proper format. For communications that travel in the opposite direction, that is, from the data processing system 390 to the tag 302, the data manipulation section 330 performs the inverse conversion process. In some embodiments, the data processing section 330 is a monolithic integrated circuit, and in some embodiments, the data processing section 330 comprises a plurality of discrete components.

The input/output section 340 in one embodiment is any one of a transmitter/receiver adapted to communicate using a format conforming to at least one of any 802.11 variant, Ethernet (packet based communication), bar code, magnetic stripe reader, RS232, RS488, USB, smartcard, infrared, laser line of sight, or telephonic communication. The input/output section 340 is in communication with as many communication ports 350, 352, 354, 356, 358 as may be provided. In the embodiment of FIG. 3, the communication ports are shown as communicating directly with the input/output section 340. In an alternative embodiment, the input/output section 340 can be connected to a selected one of the communication ports 350, 352, 354, 356, 358, for example by way of a multiplexer 342 (or Mux), such as a 1×N multiplexer having a sufficient number N of connections to service each of N or fewer ports, where N is a positive integer. In such an embodiment, the mux 342 has sufficient numbers of parallel lines per connection to service the port having the largest number of parallel lines. The mux 342 is conventionally controlled by a microprocessor, such as a microprocessor that is responsive to control by a user, by software command, or by command, such as interrupt driven command, from an external source. In a preferred embodiment, the input/output section provides bi-directional data flow. In some embodiments, the input/output section 340 provided only unidirectional data flow, for example if data flowing in only one direction is required, and cost savings can be realized by providing hardware having only the minimum required capability. In some embodiments, the input/output section 340 is capable of more than one communication format, and the input/output section 340 provides a signal to the data processing section 330 that indicates which format is intended to be used, or is operative.

By way of example, a RFID reader could extract RFID data from a short range RFID tag and the converter converts the data into a format for broadcast or transmission in a local environment. The conversion of RFID data could be into any of a large number of end formats such as: any 802.11 variant, Ethernet (packet based communication), bar code, magnetic stripe reader, RS232, RS488, USB, smartcard, infrared, laser line of sight, or telephonic communication. For the laser line of sight embodiment, RFID data could be downloaded to a reader device and then transmitted to a laser reading terminal via direct laser transmission. In some embodiments, the conversion of RFID data would improve security by limiting the distance over which a RFID tag would need to transmit. The improved security could for example be provided by making the subsequent transmission of information highly directional, for example using a laser, or otherwise highly secure, for example by using an encoded or spread spectrum communication protocol. In some embodiments, the RFID converter 310 is programmably reconfigured to communicate with a plurality of data processing systems 390, each data processing system 390 thereby being able to communicate with RFID tags, each data communication system using a communication format independent of communication formats used by any other data processing system 390.

Figure 4C:
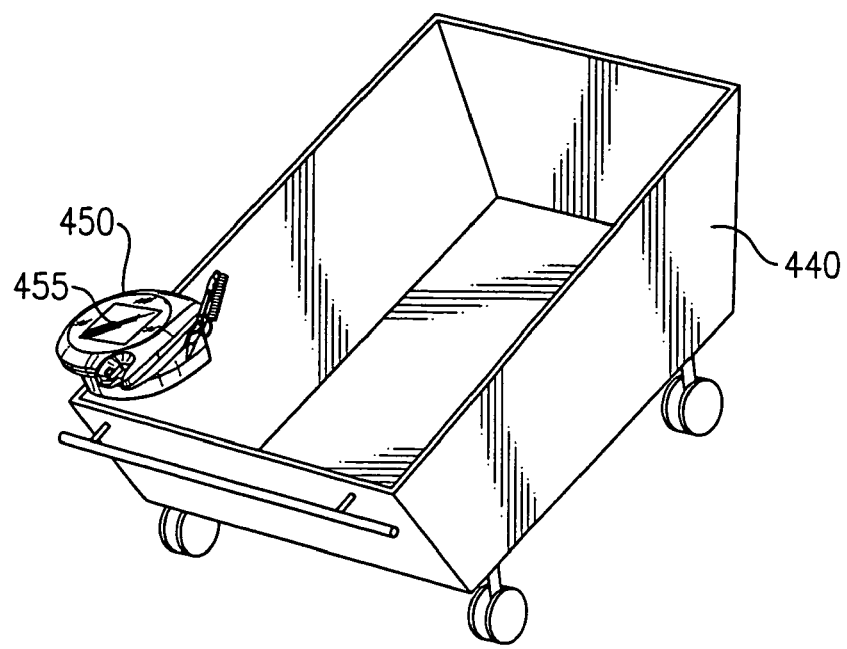
FIG. 4C illustrates an exemplary embodiment of a RFID enabled transaction terminal attached to a customer shopping device according to the principles of the invention.

FIGS. 4A, 4B, and 4C illustrate exemplary embodiments of an RFID amplifier 410. The RFID amplifier 410 is a device that is useful to extend a range of an RFID tag or RF payment token 402, for example from a few inches, to an operating distance of some feet. The RFID tag or RF payment token 402 can be a tag deliberately designed to have a short range. Short range tags improve security by making the RFID tag or RF payment token 402 more difficult to read inadvertently. In addition, by making a tag's response weaker, short range tags reduce the computational overhead to handle "clutter" that results when each person carries a number of RFID active devices, each having a different purpose and different encoding, but operating in one of the few allowable frequency bands. An embodiment that uses a supermarket shopping environment as an example of a use of the RFID amplifier technology is described.

In FIG. 4A, a first embodiment of an RFID amplifier 410 is shown that has either or both of a holder 412 for mechanically holding an RFID-bearing object 402, such as an RFID tag in an affiliation card (for example, a shopping club card, a credit card issued by the owner of the store, or a financial institution, or any form of a RF payment token as described elsewhere). In some embodiments the RFID amplifier 410 also comprises at least one switch 414 that is actuated by the shopper. In FIG. 4B, the RFID amplifier 410 is shown attached to a shopping cart 440, so that the RFID amplifier 410 travels with the shopper. In one embodiment, a shopper uses the RFID amplifier 410 by placing his or her RFID-bearing object 402 in the holder 412. The RFID amplifier 410 reads the information required from the RFID-bearing object 402 and transmits that information to one or more local points of contact 420, for use in helping the shopper locate items that the shopper wants to purchase. The information can in some embodiments be an identifier such as a number or alphanumeric string assigned to the shopper as part of setting up the affinity card account, which information has meaning only within the relationship that exists between the shopper and the store. In some embodiments, when the shopper removes the RFID-bearing object 402 from the holder 412, the system ceases using the information associated with the RFID-bearing object 402. In another embodiment, the shopper activates the system by bringing the RFID-bearing object 402 within range of the RFID amplifier 410 and activates the switch 414 to temporarily store the information read from the RFID-bearing object 402 in a temporary memory 415 in the RFID amplifier 410. The temporary memory 415 location is fixed, so storing the information read from the RFID-bearing object 402 overwrites any information that may have been previously entered therein. The shopper can put the RFID-bearing object 402 away at that time. When the shopper again activates the switch 414, the stored information read from the RFID-bearing object 402 in a temporary memory 415 in the RFID amplifier 410 is deleted, or alternatively is overwritten with random information, and the RFID amplifier 410 is ready for use by another. In another embodiment, when the RFID amplifier 410 is moved past a specific area, such as an entry/exit door of the store, it is subjected to a signal that causes the temporary memory 415 used for storing information read from an RFID-bearing object 402 to be rewritten with random information, or to be erased. In other words, when the shopper takes his or her purchases out to his or her vehicle using the shopping cart 440, the information from the RFID-bearing object 402 of the shopper that was stored in the temporary memory 415 of the RFID amplifier 410 is automatically erased or otherwise overwritten. In some embodiments, rather than a mechanical switch, the system is activated by proximity such that once a RFID bearing object 402 is recognized, an association between the RFID bearing object 402 and the RFID amplifier 410 is established and this is maintained until the shopper moves away from the RFID amplifier at which time all personnel information is erased from memory 415. The amplifier can also be configured so that that the RFID-bearing object 402 has to be sufficiently removed from the RFID amplifier for more than a minimal time period, for example 10 seconds, thereby allowing the shopper to walk to a nearby counter for assistance or to pick an item off a shelf. In this fashion there is no need for the shopper to let the RFIC bearing object 402 out of their possession until the shopper has completed shopping. The utility of erasing the temporary memory 415 of the RFID amplifier 410 is several-fold: the information of the holder of the RFID-bearing object 402 is maintained private; a subsequent user of the shopping cart 440 having the RFID amplifier 410 attached thereto is not mistaken for an earlier user; and the space allocated in the data processing system of the store for handling the needs of a shopper who has departed can be deallocated and reused for new shoppers who arrive thereafter.

In some embodiments, the RFID amplifier 410 can further comprise a visible or tactile display 416 and/or an audible signaling device 418, such as a speaker, that are used to inform the shopper of information that the shopper has requested or may find useful. In some embodiments, the display 416 comprises a touch screen and/or the audible signaling device 418 comprises a microphone, providing the shopper a bi-directional communication path to the data processing system. A local point of contact 420 in some embodiments is in bi-directional communication with a data repository and data manipulation system, such as a local financial transaction system 120 or a central financial transaction system 130. When the activated RFID amplifier 410 is brought within range of a local point of contact 420, the RFID amplifier and the local point of contact 420 exchange information, for example using short range radio communication, such as a WiFi system. The RFID amplifier 410 comprises a suitable transponder 425 for performing such communications.

The RFID amplifier 410 includes a data processor 442 that is responsive to commands from the shopper, which commands are asserted by any of a voice command, an activation of a switch such as 414 in response to information displayed or announced to the shopper, or to a command that the shopper has previously caused to be entered into the data processing system, for example, the entry of a shopping list by filling out a form, such as an interactive HTML form accessible through a web site of the store. For example, if a shopper enters a list via a web site, the shopper will be identified with the list, and the presence of the corresponding RFID bearing object 402 in the vicinity of the RFID amplifier 410 can cause the RFID amplifier 410 to communicate via transponder 425 to download a copy of the list. When the local point of contact 420 communicates with the RFID amplifier 410, the location of the shopper can be ascertained within a small radius, and information can be provided to the shopper to make the shopping experience more pleasant, quicker, and more efficient. For example, using the shopping list submitted by the shopper, and an indication that the shopper wishes to shop efficiently, the store's data processing system can suggest a routing to the shopper that is the most direct path through the store that the shopper needs to follow to collect all of the desired items, and can direct the user by visual or aural prompts. The shopper can proceed to the item of interest. When the shopper takes one or more units of the item of interest, a tag 430, such as an RFID tag or an EPC tag, attached to each unit interacts with the data processing system, for example by way of the RFID amplifier 410 or by way of the local point of contact 420, to inform the data processing system. The data processing system can then prompt the shopper to the next item. The shopper can also be made aware of specific sales or special offers that are associated with specific items on the shopping list, or that the central units knows from history are of potential interest to the shopper.

If the shopper decides to delete an item from the shopping list, the user can respond to the system by canceling the item when the prompt is provided, and the system then calculates the path to the next item on the list. If the shopper elects to browse, the shopper can issue a command to pause the prompting by the data system. The shopper can resume the prompting at any later time by canceling the pause command. The data system identifies the location of the shopper from the interactions of the RFID amplifier 410 with local points of contact 420, for example from the most recent contact, and provides prompts based on the shopper's location and interests. In other embodiments, the data processing system can provide prompts based at least in part on the shopper's expressed preferences, including shopping lists and purchasing history, about items on sale or items typically associated with items that the shopper has already selected. For example, a shopper who has selected a container of corn chips might be prompted that the dips and the salsa are to be found in a particular location.

FIG. 4C shows one embodiment of a transaction terminal 450 comprising a RF I/R 114 that can be used to facilitate the purchase of goods by a consumer. The transaction terminal 450 shown is attached to a shopping cart 440 and can be used to record information regarding the items that have been selected by a consumer. These items can be ones about which a consumer desires additional information or items that a customer desires to purchase. The transaction terminal 450 can also be used to complete the financial aspects of the purchase. In one embodiment, as a consumer collects goods and places them in the shopping cart 440, the RF I/R 114 reads the RFID tags 430 on goods and adds them to a running total. In one embodiment, the running total including a description of the goods and the number of each particular item is presented on a display 455 of the transaction terminal 450. In a further embodiment, to ensure that the transaction terminal 450 does not erroneously record goods remaining on the shelves as purchased, the RF I/R 114 can be configured such that the goods must each be brought into close proximity with the RF I/R 114.

If instead of purchasing an item, a customer simply desires additional information regarding an item such as promotions available, the location of related items, recipes using the item, warranties or additional technical information, and/or any product related material targeted to the customer or selected by the items manufacturer or by the store, the customer can change the operation of the transaction terminal 450 from a purchase mode to a information mode. As described above, the additional information can also be generated based on the customer's location so that, for example, promotions for items are presented based on the customer's proximity to those items. In one embodiment, the information mode causes the desired information to be presented on the display 455. In another embodiment, the transaction terminal 450 is in communication, for example via wireless network, with a backroom or remote system via, for example, one of the local point of contacts 420. In one embodiment, the backroom or remote system sends electronic mail to the customer regarding promotional or product related information for a product in response to a user interaction with the transaction terminal. In another embodiment, the information from the transaction terminal 450 regarding the item of interest is used to send promotional or related materials to the customer via regular mail. For both the electronic and the regular mail correspondence the customer's specific information, such as his or her physical or electronic address, can be accessed directly from the RFID-bearing item 402 or from an account associated with the RFID-bearing item 402. In another embodiment, product related information is also displayed to the customer while the transaction terminal 450 is in purchase mode. In this embodiment, the display 455 can simultaneously or alternatively present the running total for the selected items with the promotional, customer location, or product related information. In another embodiment, promotional or product related information can be sent to a customer in response to a customer placing his or her RFID-bearing object 402 in close proximity to an RF enabled in-store promotion.

In another embodiment, as part of the purchase mode of the transaction terminal 450, each RFID tag 430 on a purchased item can be disabled once recorded for purchase and the purchase is completed. In one embodiment, the disablement is achieved by exposing the RFID tag 430 to a dose of electromagnetic radiation strong enough to permanently incapacitate at least a portion of the electric circuitry in the RFID tag 430. In another embodiment, the RFID tag 430 is disabled by having information written to the RFID tag 430, such as an indication that the item has been paid for at a specific location and time. When a consumer exits the shopping establishment, a exit sensor apparatus determines whether any items in the shopping cart 440 are still active and have not, therefore, been purchased. In another embodiment to help ensure that all items removed from the store have been purchased, an alarm will sound upon exit if the transaction terminal 450 attached to the shopping cart 440 does not indicate receipt of proper payment either from a RFID-bearing object 402 or a payment authorization from a point-of-sale device, such as a cash register. In an alternative embodiment, the exit sensor apparatus has a RF I/R 114 that determines the items in the shopping cart 440 and compares them with the items indicated as purchased by the transaction terminal 450. In one embodiment, the purchase of the goods is completed by a consumer's interaction with the transaction terminal 450, such as signing and transmitting authorization information. Typically this interaction would take place prior to the consumer encountering the exit sensor apparatus. In another embodiment when the consumer provides his or her payment information, such as a RF enabled payment token, a standard magnetic stripe credit card, store card, debit card, ATM card or the like the transaction terminal 450 determines a preapproved spending limit. In various embodiments, a preapproved spending limit is determined by a vendor (e.g., a limit for a store card), by a consumer's predefined transaction limit as specified by the consumer (e.g., a daily limit on an ATM card), or by the financial institution issuing the consumer's payment instrument or token (e.g., a credit limit on a credit card, or a limit on a debit card based on an account balance). In alternative embodiments, the preapproved limit is based on the identity of the payment instrument or token so that, for example, a VISA™ card has a first transaction limit whereas a store specific card, such as a loyalty card, has a different limit. In alternative embodiments the transaction terminal 450 can be replaced with alternative computing devices of arbitrary form factors such as cell phones, personal data assistants, portable data terminals (discussed in more detail below), or other devices that can be affixed to the shopping cart 450 or provided by the store.

Figure 4D:
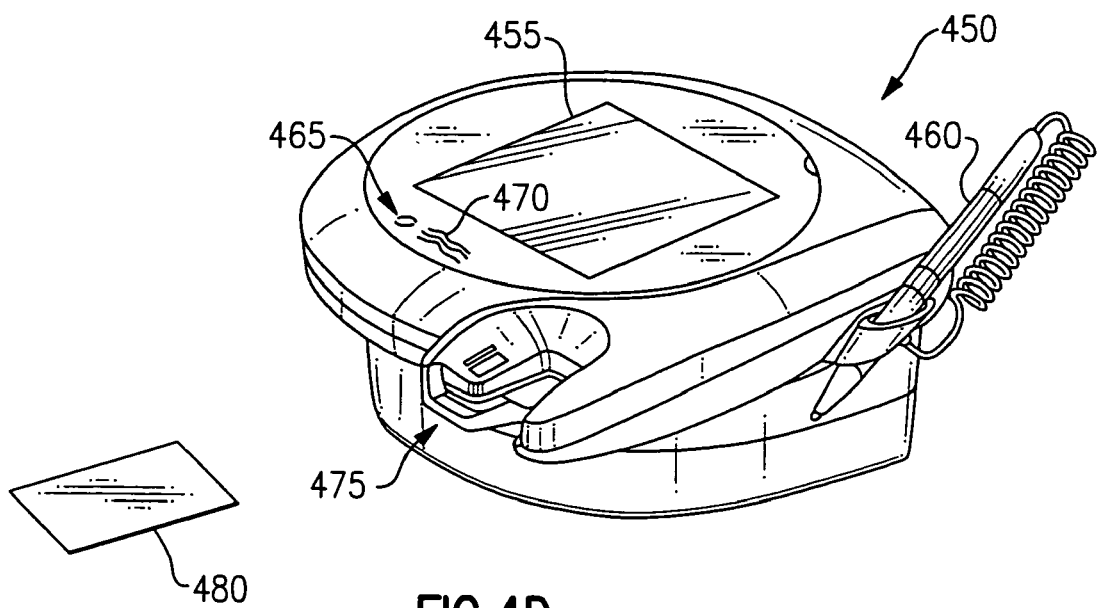
FIG. 4D illustrates the details of one embodiment of the transaction terminal shown in FIG. 4C.

FIG. 4D shows an enlarged perspective drawing of one embodiment of the transaction terminal 450 of FIG. 4C. In various embodiments, the transaction terminal 450 can be one of the Transaction Team™ 8870 Image Kiosks, 8810 or 3101 Transaction Terminals, or 1500 Signature Capture Pads available from Hand Held Products, Inc. of 700 Visions Drive, P.O. Box 208, Skaneateles Falls, N.Y. constructed in accordance with the invention. In operation the transaction terminal 450 may be adapted for reading card information, for secure receipt of personal identification (PIN) information, for signature capture, for secure interactive communications and numerous other functions.

The transaction terminal 450 includes a touch screen 455, a stylus 460, an indicator 465, an information message 470, and an integrated RFID card reader and decoder 475. In some embodiments, the transaction terminal includes a biometric reading device such as a fingerprint scanner, which can be implemented using a touch-sensitive device or an imaging device that records the details of the biometric information. According to the invention, the integrated RFID card reader and decoder 475 can be replaced or combined with other devices such as those performing the functionality of image, smartcard, or biometric reading and decoding. The touch screen 455 and the stylus 460 are used as user interfaces to provide information to and receive information from a user/customer. The touch screen 455 includes a display and a touch pad overlay and among other functions serves as a virtual keypad and signature capture platform. A card 480 that is processed by the RFID card reader and decoder 475 may be, for example, a credit card, a debit card, a customer loyalty card, an electronic benefits card, a company-sponsored benefits card, an identification card or the like that is RFID enabled. In addition to RFID capacity in one embodiment, the card 480 can include traditional payment technology such as a magnetic stripe and the RFID reader and decoder 475 can be replaced with a reader and decoder capable of reading and decoding both RFID and magnetic stripe information.

Security for the transaction terminal 450 is facilitated by the indicator 465 and the information message 470. In operation the indicator 465 is made responsive to a changing encryption mode signal so that the indicator 465 is active only when an encryption routine is called. Still further, in accordance with the secure information entry security feature, in one embodiment an information message 470 is displayed on or about the transaction terminal 450 or visible by a customer/user of the transaction terminal 450 that informs the customer-user that the customer/user should enter secure, e.g., PIN information, only if indicator 465 is active. Information message 470 is preferably substantially permanently affixed to the transaction terminal 450 so that an unscrupulous party cannot easily remove or destroy the message 470.

In alternative embodiments the transaction terminal 450 can be of an alternative form factor designed to fit on different portions of the shopping card 440 or another customer shopping device such as a basket or trolley. With respect to the shopping cart embodiments, alternative locations for a transaction terminal with a different form factor such as a relatively thin profile include vertical placement on the interior or exterior of one of the sides of the cart.

Figure 5:
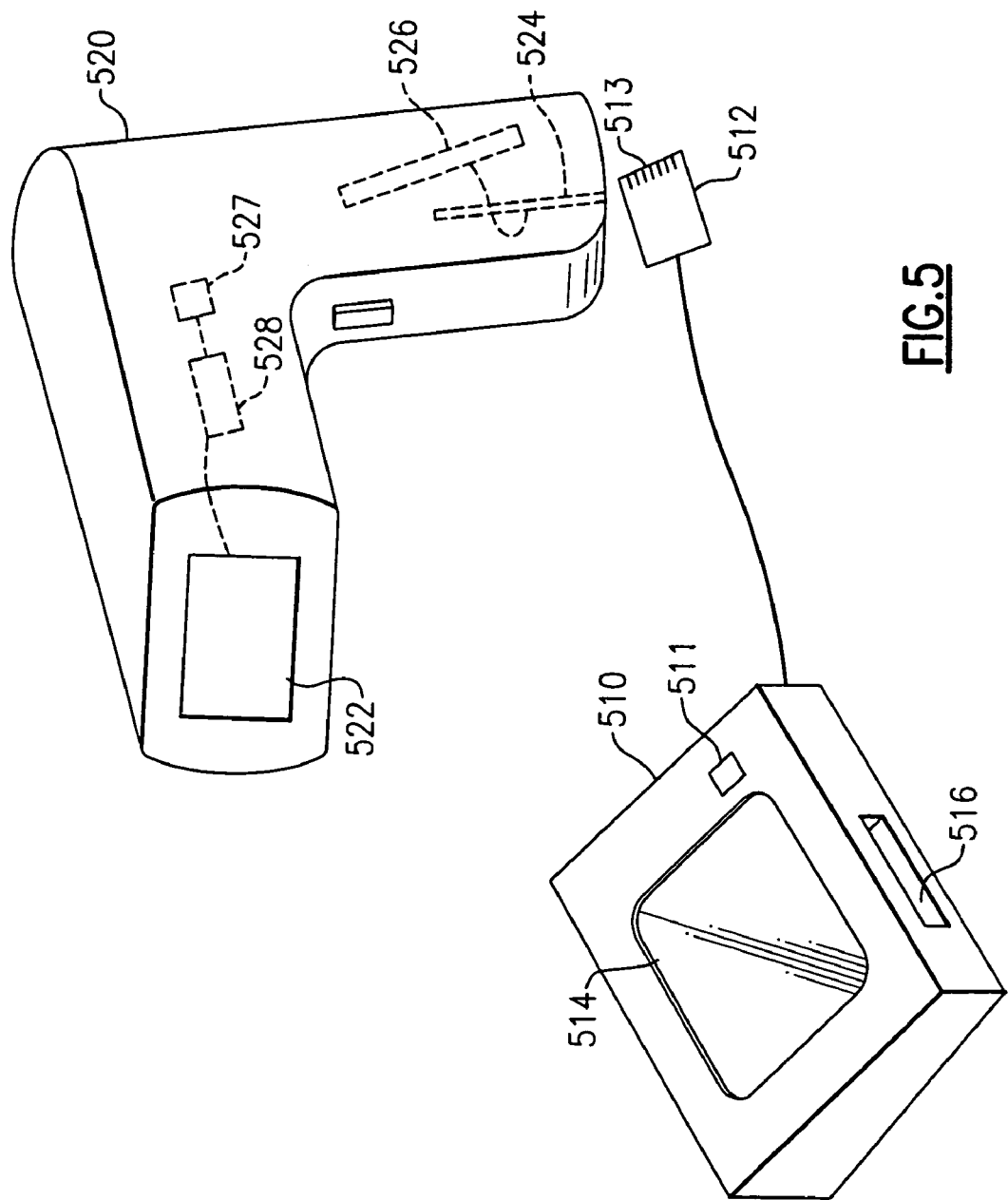
FIG. 5 illustrates an exemplary embodiment of an RFID add-on reader device, according to principles of the invention.

FIG. 5 illustrates an exemplary embodiment of an RFID add-on reader device 510 for use with an existing reading device 520 to provide the supplemental capability of reading RFID signals. The RFID add-on reader device 510 comprises a connector 512 including a plurality of electrical connections 513, a transponder 514 for activating an RFID tag and for receiving the response from an RFID tag, and an optional port 516. In the embodiment shown in FIG. 5, the existing reader device 520 is a bar code reader, such as a HHP Model IT4600 2D bar code scanner. The existing reading device 520 can be any one or more of an optical imaging device 522, such as an electronic camera or a similar CCD or CMOS imaging array, for example for reading barcodes; a magnetic symbol reading device 524; an electrical connector 526 having sufficient electrical contacts to communicate electrically with an integrated circuit card (such as an IC card, a "Smart Card," a PCMCIA card, a PC card); and a microprocessor 528 in electrical communication with each of the optical imaging device 522, the magnetic reading device 524, the electrical connector 526 and with a memory 527 associated with the microprocessor. In the embodiment shown, the RFID add-on reader device 510 comprises a connector 512 in the form of a PCMCIA card that connects to a PCMCIA slot 526 in the existing reading device 520. In other embodiments, the connector 512 is configured as a USB connector, an RS232 connector, or another conventional connector that connects to an existing port in the existing reading device 520. In another embodiment, the RFID add-on reader device 510 comprises an optional port 516 that is equivalent to the existing port in the existing reading device 520, so that the RFID add-on reader device 510 can be interposed between the existing reading device and a device that would normally be connected to the existing reading device using the existing port. The RFID add-on reader device 510 comprises all of the necessary hardware and software for performing the RFID activating and reading operations, as described hereinabove. Software operating on a microprocessor 511 in the RFID add-on reader device 510 controls the transmission and reception of information to the existing reading device 520 and to the system with which the existing reading device 520 communicates, including such matters as timing, formatting, and signal management. The RFID add-on reader device 510 provides the ability to read RFID tags, and to write to RFID tags as appropriate, in a manner that is transparent to the user. To the extent that the existing reading device 520 will support the connection of the RFID add-on reader device 510, the performance of the RFID add-on reader device 510 is equivalent to the performance of a reading device such as device 110 that includes an RFID reader as original equipment. In some embodiments, the connector 512 is a wireless connector such as an RF or a IRDA connector.

Figure 6:
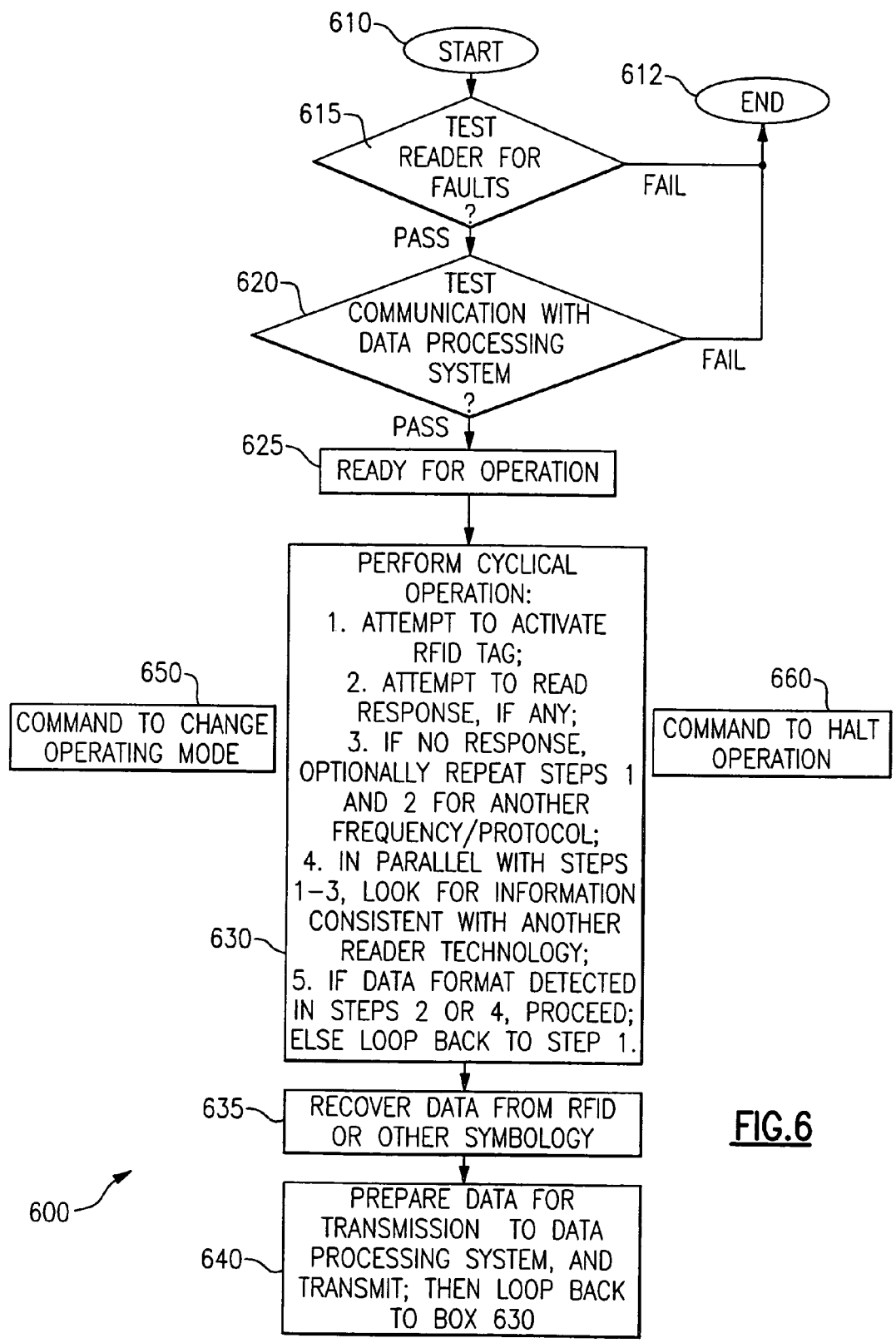
FIG. 6 illustrates exemplary embodiments of operating methods of RFID readers controlled by software, according to principles of the invention.

FIG. 6 illustrates exemplary embodiments of operating methods of RFID readers controlled by software generally designated 600. As will be understood by those of ordinary skill in the software arts, there are in general many different ways to prepare computer instructions in the form of software that perform particular functions. Accordingly, the present discussion is limited to a high level discussion of how the operating methods of RFID readers are controlled. Explicit coding examples are not given; those of ordinary skill will understand how to write instructions that control the necessary tasks. The methods of operation will be discussed in broad categories, including procedures for setting up, maintaining, upgrading, and handling fault conditions in the RFID reader system, procedures for communicating with RFID tags, procedures for communicating with data processing systems, and procedures for communicating with a user. In addition, software is used to control features of the system relating to security, including formatting and decoding data and messages according to security protocols.

FIG. 6 shows a process that begins at oval 610 labeled "Start." As a first operation, the reader is tested to confirm proper operation, as indicated by the decision diamond 615 labeled "Test Reader for Faults." If the reader fails the test, as indicated by the arrow marked "Fail," the process ceases, as indicated by the oval 612 marked "End." If the reader passes this test, another test takes place as indicated by the arrow labeled "Pass", namely a check of the communication of the reader with a data processing system, as indicated by the decision diamond 620, labeled "Test Communication with Data Processing System." If the reader fails the test, as indicated by the arrow marked "Fail," the process ceases, as indicated by the oval 612 marked "End." As will be apparent to those of ordinary skill in the computer programming arts, the order in which tests 615 and 620 occur is irrelevant, because the operation will cease if either test fails, and the operation will proceed only if both tests have acceptable outcomes.

If both tests 615 and 620 pass, operation continues as indicated by box 625, labeled "Ready for operation," which denotes that the RFID reader is properly operating and is programmed in a default mode, in which reading and communication operations are programmed for operation. As indicated at box 630, the reader operates in a cyclical mode, comprising a sequence of steps in a loop. The cyclical steps include: 1. an attempt to activate an RFID tag; 2. an attempt to read a response received from the RFID tag, if any response occurs; 3. if no response is received, the RFID reader optionally repeat steps 1 and 2 for another RFID frequency/protocol; 4. in parallel with steps 1-3, the reader attempts to read information consistent with another reader technology as enumerated hereinabove, for example, barcode or magnetic stripe; and 5. if a data format is detected in either steps 2 or 4, the process proceeds to the next step at box 635; or else, the process loops back to step 1, and the cycle continues. The attempt to activate an RFID tag can also involve writing to the tag. As indicated at box 635, the reader recovers data from the RFID or other symbology that has been read. At box 640, the reader prepares the data for transmission to data processing system, for example by formatting a message, and transmits the recovered data to the data processing system. Upon transmitting the information, the reader loops back to the cyclic operation indicated at box 630. As indicated at box 650, a command to change the operating mode of the RFID reader can be sent from an external source, such as a user or a data processing system, and can be implemented at any point in the process from box 625 through box 640. The command to change the operating mode can for example involve an interrupt, which can halt any computer process having lower priority, as is well known in the computer programming arts. As indicated at box 660, a command to halt the operation of the RFID reader can be sent from an external source, such as a user or a data processing system, and can be implemented at any point in the process from box 625 through box 640. The command to halt operation of the RFID reader can for example involve an interrupt, which can halt any computer process having lower priority, as is well known in the computer programming arts.

Figure 7A:
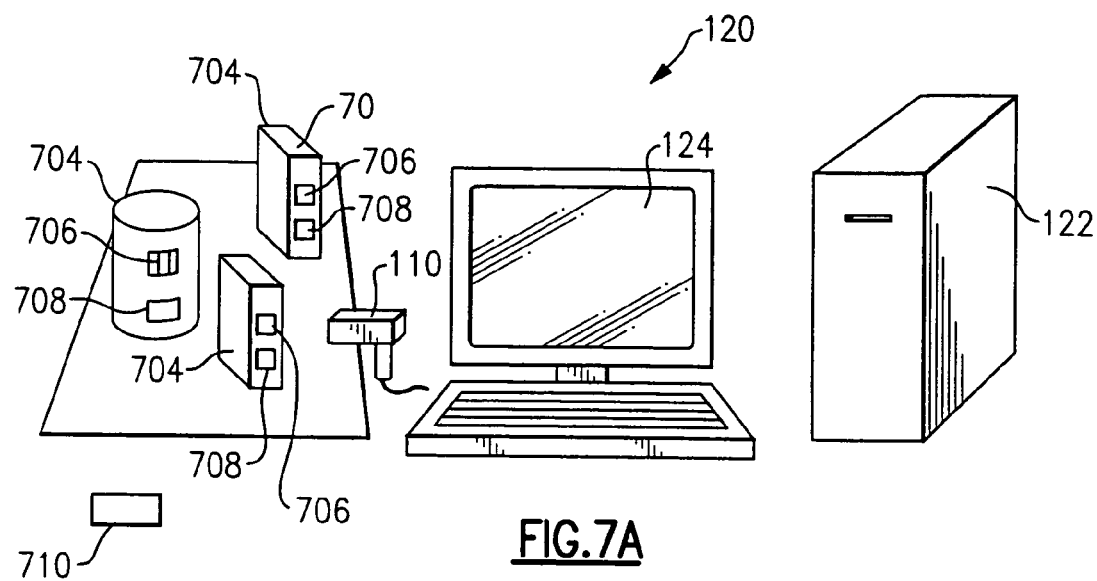
FIG. 7A illustrates an exemplary embodiment of a local financial transaction system enabled to read RFID tags and RF payment information according to the principles of the invention.
Figure 7B:
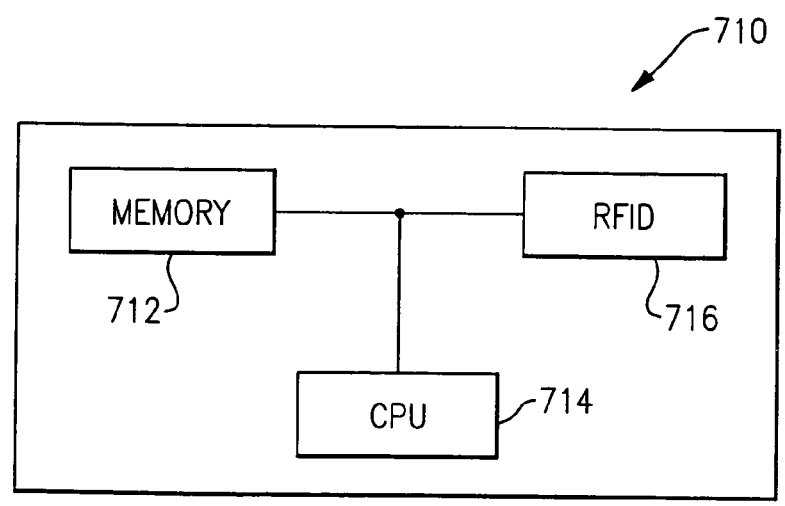
FIG. 7B illustrates an exemplary embodiment of a transaction card according to the principles of the invention.

Referring to FIG. 7A, an embodiment of the local financial transaction system 120 in which the point of sale terminal 122 is a PC based cash register is shown. The financial transaction system 120 includes the display 124, a keyboard 702, and the hand-held portable proximity device 110. The present embodiment is particularly suited to conducting financial transaction in supermarkets and other retail environments in which a customer wishes to purchase a plurality of products 704. Each of the plurality of products 704 includes as product related identifiers a graphical symbol 706 and a RFID tag 708. The graphical symbol can be any of the commonly employed one dimensional, high density one dimensional, one dimensional stacked, and two dimensional matrix codes. Also shown in FIG. 7A is a transaction card 710 that is an example of a proximity payment token as discussed elsewhere herein. In one embodiment as shown in FIG. 7B, the transaction card 710 includes a memory 712, an electronic circuit 714, such as an integrated circuit microprocessor CPU, for controlling the operation of the transaction card 710, and RF payment circuitry 716 such as a RF transponder and control circuitry. As described above in operation, the RF payment circuitry 716 is typically interrogated by a RF device that energizes the RF payment circuitry 716 to generate a response transmission including, for example, payment information such as a credit card account number. The transaction card 710 can be in the form of a credit card, debit card, ATM card or any other commercially enabling card or appropriate alternative functional forms that may be envisioned and can additionally include, although not limited to, graphics, symbols, text, magnetic recordings, electronic circuitry and electrical contacts for direct electrical interaction with a proximity transaction or security system. While product related identifiers above are shown and discussed with respect to a the graphical symbol 706 and the RFID tag 708 other product related identifiers including text, images, and magnetic recordings are contemplated in accordance with the present invention.

In one embodiment, the graphical symbol 706 and the RFID tag 708 can store complementary, redundant or separate information. For example both of the product related identifiers 706, 708 can store the same manufacture and product code information according to a specified standard such as UPC/EAN. Alternatively in one embodiment, the graphical symbol 706 stores one form of product information, such as UPC/EAN information, while the RFID tag 708 stores another form of product information, such as EPC information. In an additional embodiment, one of the product related identifiers represents a product identifying code while the other product identifier represents supplemental information related to the product such as discounts or coupons available. In a further embodiment, the supplemental information is accessed in response to a specified interaction with the transaction card 710. For example, if the transaction card 710 stores information that the current customer is a member of a store membership or other benefits program, then the proximity transaction system directs the proximity device 110 to query the RFID tags 708 as to discounts or promotions available. In a medical environment, such as a medicine distribution system, the RFID tag can include information about incompatibilities with other medications so that a warning is issued if a selected medication that should not be used with the medication is suggested for use. In some embodiments, safety checks for medical incompatibility are implemented.

In an alternative embodiment, the graphical symbol 706 is a barcode symbol and the RFID tag 708 stores product expiration information, such as a critical expiration date for a medication. In addition, temperature sensors can be used to monitor that the medication or product has been properly stored, for example that a maximum or a minimum temperature have not been exceeded. In an additional embodiment, the RFID tag 708 stores state data indicative of the conditions having been experienced by the product 704. The state data stored in the memory 712 can be stored in the memory 712 based on a number of criterion including set time intervals, set physical locations, set changes in environment. The state data can be generated by devices on the RFID tag 708, such as a temperature, humidity, or similar environmental reading devices. The state data can also be generated by a separate device that broadcasts to the RFID tag 708, or to a plurality of RFID tags 708 such as would be found in a shipping container or a warehouse, data representing the current environmental state.

Whether the proximity device 110 reads one or both of the product related identifiers 706, 708 can be manually determined by the operator or automatically configured as part of the operation of the local point of sale terminal 122. As part of the automatic operation, the proximity device can be configured to determine the appropriate product related identifier 706, 708 by, for example, reading both identifiers 706, 708 and determining the one containing product code information.

In one embodiment of the invention, the local financial transaction system is able to process information recorded on a graphical symbol 706 or the RFID tag 708 attached to products and payment information in an arbitrary order. For example, as part of the purchase of the products 704 in one embodiment an operator of the local point of sale terminal 122 uses the proximity device 110 to read either the graphical symbol 706 or the RFID tag 708 for the products that are presented for purchase. After the products 704 have been read, the operator uses the proximity device 110 to read financial data from the transaction card 710 to complete the purchase of the products. The sequence of items read by the proximity device 110 can be represented as:

product, product, product, transaction card.

Alternatively, as part of the purchase of the products 704, the operator can read the transaction card either before during the reading of the products. The sequence of items read by the proximity device 110 in these cases can be represented, respectively, as:

transaction card, product, product, product, or product, product, transaction card, product.

As one of ordinary skill will recognize, although reference is made to products, the systems and methods of the invention are equally applicable to services, or a mixture of products and services. In addition, the term product as used in the three sequences illustrated above can represent plural examples of the same product, or examples of a plurality of different products in any combination.

In one embodiment, the process of reading products and payment information in an arbitrary order involves the proximity device 110 automatically determining the nature of the item presented for reading. For example, based on an analysis of the data received, the proximity device can determine that the information read from an item corresponds to a UPC product code. As such the data is passed to a routine that determines the price of the item in a look-up table and adds it to a running total of the items being purchased. Alternatively, the proximity device 110 can determine that the data received corresponds to a bank or credit card account information. As such, the data is passed to a routine that requests authorization to charge the corresponding account once a total has been determined for all of the products being purchased.

In one embodiment the invention features a dual mode bar code and radio frequency identification reader that reads bar codes and radio frequency identification tags in an arbitrary order. The dual mode bar code and radio frequency identification reader comprises an optical energy collection device that receives optical energy reflected from one or more bar codes on one or more targets and converts the optical energy into one or more electronic representations of the one or more bar codes. In some embodiments, the optical energy collection device is a solid state device. The dual mode bar code and radio frequency identification reader also comprises interrogation reception electrical circuitry that energizes with radio waves a passive transponder in the target to transmit radio signals containing customer financial information. The interrogation reception electrical circuitry converts the radio signals into an electronic representation of the customer financial information. The financial information can include an account identifier, an identifier of a holder of the transponder, information about a financial condition of the account or of the holder of the transponder, information about the financial practices of the holder of the transponder, and information about a spending limit. The dual mode bar code and radio frequency identification reader further comprises a central processing unit in electrical communication with the solid state energy collection device and the interrogation reception electrical circuitry. Additionally the dual mode bar code and radio frequency identification reader comprises a computer memory in electrical communication with the central processing unit and a decoding software module stored in the computer memory. The decoding software module when executed by the central processing unit automatically discriminates between and decodes the electronic representation of the customer financial information and the electronic representations of the one or more bar codes. In operation when the central processing unit is executing the decoding software module, the dual mode bar code and radio frequency identification reader can process the electronic representation of the customer financial information and the one or more electronic representations of the one or more bar codes in an arbitrary order.

In one embodiment of the invention, the memory 712 stores information related to bearer of the transaction card 710. Non-limiting examples of the data contained in the memory 712 include information related to multiple financial accounts such as a plurality of credit card and bank accounts and personal information related to the bearer such as the bearer's social security number and/or driver's license number, medical information such as allergies or specific medical conditions, security information such as access codes or biometric information such as fingerprint or iris scan information, etc. In alternative embodiments of the transaction card 710, the plurality of information related to the bearer is stored in a combination of the available formats discussed above. For example, credit card information can be stored in magnetic format, medical information as a graphical symbol, and security information in the memory available for RFID interrogation.

In one embodiment of the invention the transaction card 710 is used to enable an optimized financial transaction. The optimized financial transaction can be structured to optimize a value of one or more parameters related to the transaction including but not limited to cost and or benefits accrued to the consumer. For example as part of the commercial transaction described above in which a customer purchases a number of products an optimized financial transaction can include determining the payment method most advantageous to the customer. In one embodiment, a transaction routine executed by the local financial transaction system 120 queries the transaction card 710 to determine the financial accounts available for payment. In determining which of the available accounts should be used for payment, the transaction routine can search either local or remote databases. For example, the transaction routine can search for discounts associated with the products if payment is completed with a specified account. For example, the transaction routine can determine that the customer holds a credit card account with the retail establishment selling the goods and that a discount or the accrual of benefit points is available if the retail establishment account is used. Alternatively, the transaction routine can check whether other benefits, such as frequent flier miles, are available if another account is used. In an alternative embodiment, the transaction routine can determine that the purchase of the current products will allow the customer to pass a minimum level necessary to qualify for a particular promotion. In one embodiment, the transaction routine considers all of the products 704 purchased and all of the accounts available as part of determining the most advantageous payment approach for the customer. In selecting the account to utilize, the transaction routine can be automatically configured to chose according to specified parameters, to present information to the customer to make the selection, or to query a transaction card 710 that has been configured to provide a set of preferences to be used in selecting accounts. For example, the preferences can indicate that a set of credit cards is to be used in a specified order as certain limits are reached for each corresponding account. Such a set of preferences can be implemented by maintaining a list of preferences in software, either on the transaction card 710 itself, or in a database that is queried upon presentation of the transaction card 710 for a purchase.

One embodiment of the invention features a point of sale financial transaction bar code and radio frequency identification system. The point of sale financial transaction bar code and radio frequency identification system comprises an optical energy collection device that receives optical energy reflected from one or more bar codes on one or more targets and converts the optical energy into one or more electronic representations of the one or more bar codes. The point of sale financial transaction bar code and radio frequency identification system also comprises interrogation reception electrical circuitry that energizes with radio waves a passive transponder in the target to transmit radio signals containing customer financial information. The interrogation reception electrical circuitry converts the radio signals into an electronic representation of the customer financial information. The point of sale financial transaction bar code and radio frequency identification system further comprises a central processing unit in electrical communication with the solid state energy collection device and the interrogation reception electrical circuitry. In addition the point of sale financial transaction bar code and radio frequency identification system comprises a computer memory in electrical communication with the central processing unit and first, second and third software modules stored in the computer memory. The first software module when executed by the central processing unit automatically discriminates between the electronic representation of the customer financial information and the electronic representations of the one or more bar codes. The first software module also decodes the electronic representation of the customer financial information into customer financial data and the electronic representations of the one or more bar codes into decoded bar code data. The second software module when executed by the central processing unit communicates the decoded bar code data to a point of sale device, such as a cash register or transaction terminal. The point of sale device determines a transaction amount from the decoded bar code data. The third software module when executed by the central processing unit communicates the user financial information to the point of sale device for transmission to a financial institution for authorization to apply the transaction amount against a user account.

In one embodiment of the point of sale financial transaction bar code and radio frequency identification system, the target is a credit card and the user account is a credit card account. In another embodiment of the point of sale financial transaction bar code and radio frequency identification system, the target is a debit card and the user account is a bank account. In a further embodiment of the point of sale financial transaction bar code and radio frequency identification system, the central processing unit executing the first software module can process the electronic representation of the customer financial information and the one or more electronic representations of the one or more bar codes in an arbitrary order.

In another embodiment, the memory 712 is used to enhance the security of using the transaction card 710 by employing it to store details pertaining to a particular transaction. For example in one embodiment each proximity device 110 is assigned a unique identifier. As part of interrogating a transaction card 710, a proximity device 110 transmits its identifier to the transaction card 710. The transaction card 710 then stores information regarding each transaction in the memory 712. In one embodiment, this information includes the date, time and amount of each transaction as well as the unique identifier for each corresponding proximity device 110. In one embodiment, the information regarding transaction stored in the memory 712 is accessed if disputes or questions exist about one or more transactions. In another embodiment, the transaction information is periodically used to confirm activity by the transaction card 710. For example, in one embodiment the bearer of the transaction card 710 places the transaction card 710 in a verification device that automatically downloads the transaction information. This information can be immediately presented to the bearer for review and/or confirmation of transactions. In another embodiment, the information is stored for future reference and/or retrieval.

Referring to FIG. 8A, a proximity device configuration system 800 is shown. The proximity device configuration system includes a hand-held proximity device 110 and a RFID configuration tag 804. In operation the configuration of the hand-held proximity device 110 can be accomplished manually or automatically. According to manual operation, an operator brings the hand-held proximity device 110 to within a specified distance of the RFID configuration tag 804 and actuates a configuration routine. The configuration routine interrogates the RFID configuration tag 804 for the configuration data stored on the card and uses this to configure the appropriate settings for the hand-held proximity device 110. In one embodiment the operator determines the settings to be configured and in another embodiment, the settings are determined in response to data contained in the RFID configuration tag 804. In automatic operation, the hand-held proximity device 110 continuously or at set intervals transmits interrogation signals to determine whether any RFID configuration tags 804 are within the device's field of operation. If RFID configuration tags are present, then the configuration occurs automatically. In one embodiment the hand-held proximity device 110 is in communication with a transaction terminal, a portable data terminal, a cash register or the like that is equipped with a RFID configuration tag 804. To establish proper operation, the RFID configuration tag 804 is interrogated to provide details concerning the device to which the hand-held proximity device 110 is being attached. In one embodiment, the configuration details include a manufacturer code and a product code, such as a UPC code, that the hand-held proximity device 110 can use to access a local or a remote configuration database to provide the set of appropriate configuration settings. Although the configuration process is described above with respect to the hand-held proximity device 110, other proximity devices such as transaction terminals, portable data terminals, and the like are contemplated in accordance with the invention. In alternative embodiments, the proximity device 110 is included in a computer peripheral such a monitor, a keyboard, a printer, a scanner, and the like. According to the invention, the configuration of the computer peripheral to interface properly with a computing device to which it is attached can occur automatically in response to the proximity device interrogating the RFID configuration tag 804 for the configuration settings. In various embodiments, the computing device is a personal computer, a laptop computer, a PDA, a transaction terminal, a portable data terminal and the like.

Referring to FIG. 8B an embodiment of a system 820 for storing and updating device related information is shown. The system 820 comprises a portable data terminal 822 that is in communication with a plurality of peripheral devices. The portable data terminal 822 comprises a display 826 and one or more interface mechanisms 828. The peripheral devices shown comprise a hand-held proximity device 110 and a receipt printer 830. The receipt printer 830 comprises a display 832, interface indicators 834, and interface mechanisms 836. Attached to the portable data terminal 822, the hand-held proximity device 110 and the receipt printer 830 are RFID device information tags 838. In one embodiment, the RFID device information tags 838 contain device specific information such as warranty and service record information. In operation the warranty and service information can be read by the hand-held proximity device 110 or another proximity device 110. In one embodiment, the system 820 is used by a technician to determine part and manufacturing details as well as the status of any available warranties or service records related to the device. In one embodiment, the technician is a repair technician attempting to repair a malfunctioning device. In another embodiment, the technician is a service technician who may be determining whether the device is due for regular maintenance. In an alternative embodiment, the RFID device information tags 838 can be attached to any device requiring device specific records such as warranty, service, and/or manufacturing/product details. Such devices include but are not limited to ground, air and water transportation vehicles such as automobiles, trucks, boats, and airplanes and their components; manufacturing and production devices and apparatuses; electronic equipment such as televisions, radios, compact disk players, computers, printers, and the like; and appliances such as refrigerators, stoves, dishwashers, washer/dryers and the like for use in domestic or commercial applications.

One embodiment of the invention related to the automatic configuration of devices by items used with those devices is shown with respect to FIG. 8C. Specifically, FIG. 8C shows a food item 808 with an attached RFID instructions tag 812 that is placed in a cooking device 816, such as a microwave or a conventional oven. According to the invention, the cooking device 816 includes a proximity device 110. In operation to cook, heat or other wise process the food item 808, an operator of the cooking device 816 actuates a process routine that includes the proximity device 110 interrogating the RFID instructions tag 812 to determine the nature of the food item 808 and/or the processing instructions. In one embodiment, the instruction details include a manufacturer code and a product code, such as a UPC code, that the proximity device 110 and/or the cooking device 816 can use to access a local or a remote configuration database to provide the proper processing instructions. In an alternative embodiment, the RFID instruction tag 812 includes instructions such as the power setting or temperature settings and time duration to be employed by the microwave or conventional oven. Because a tag that is subjected to processing may be destroyed in the microwave or oven, it can be used to contain information that can be transferred to the microwave or oven prior to operation. The information can relate to one or more processing steps. Alternatively, the tag can be removed from the product to be processed before processing begins, so that it can be held aside and used for providing instructions for processing that requires multiple steps.

In another embodiment as shown in FIG. 8D, a RFID information and access tag 816 is included in a bracelet 816a, a ring 816b, or a similar portable item conveniently attachable to a person, such as a wristwatch, a belt, a necklace, or an article of clothing. In a medical environment, the bracelet 816a can be interrogated by a health professional wishing to know the certain medical data. In an alternative embodiment, the bracelet 816a includes an identifier that is used to access a local or a remote database, by for example wireless communication, for personal or medical records. In another embodiment related to the operation of medical devices, the RFID information and access tag 816 can be interrogated by a medicine dispensing apparatus prior to the provision of drugs to a patient. The data provided by the interrogation can be used to ensure that the proper medicine and dosage is being delivered to the appropriate patient, and to provide warnings about improper uses of medications or contraindications. Similarly, the bracelet can function as a medical alert bracelet so that if a patient in a hospital or elsewhere is incapacitated, primary medical information such as allergies and blood type can still be readily accessed.

Referring to FIGS. 9A, 9B, 9C, and 9D, embodiments of apparatuses that provide security for payment tokens, or other RFID tags, are shown. In the embodiment shown in FIG. 9A, the payment token is a transaction card 710 as described above. The security apparatus 900 comprises an electromagnetically conductive case (or Faraday enclosure) 904 that is designed to shield the transaction card 710, and in particular, the RF payment circuitry 716 of the transaction card 710, from external electromagnetic signals. The electromagnetically conductive case 904 in some embodiments is an envelope or pocket comprising aluminized plastic or mylar. As those of ordinary skill will understand, other materials that allow the provision of a suitable Faraday enclosure can be employed as equivalents of aluminized plastic or mylar. In some embodiments, the electromagnetically conductive case 904 covers all or substantially all of the transaction card 710 when the card is in the shielded position. In some embodiments, when the card is in the shielded position, the electromagnetically conductive case 904 covers a portion of the transaction card 710, for example a portion of an antenna present in or on the card sufficient to disable the operation of the transaction card 710. A bearer of the transaction card 710 places the card in the electromagnetically conductive case 904 whenever he or she wishes to ensure that unauthorized readings of the transaction card 710 do not occur.

Figure 9A:
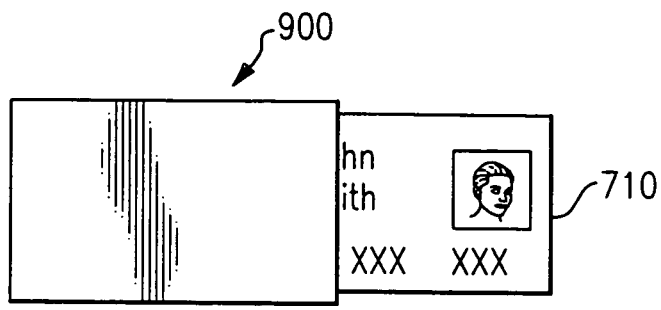
FIGS. 9A, 9B, 9C, and 9D illustrate exemplary embodiments of security apparatuses for payment tokens according to the principles of the invention.
Figure 9B:
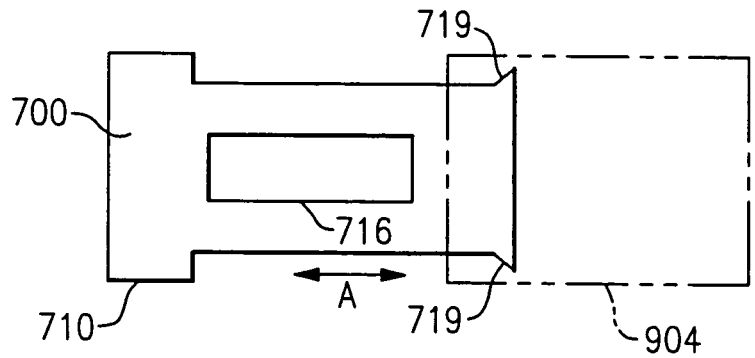

Unauthorized readings include the actions of unscrupulous parties using a RFID interrogation device to interrogate transaction cards 710 while the bearers are not aware that such interrogations are taking place. Such readings could occur in environments where the public is commonly in close proximity, for example on public walkways, on public conveyances, or in stores. The present invention prevents unauthorized readings by ensuring that the electromagnetic signals comprising the interrogation signal do not reach the transaction card 710. Further, even if a powerful interrogator were employed, the electromagnetically conductive case 904 would prevent any response signal from the transaction card from being transmitted back to the interrogating device. When the bearer wishes to use the transaction card 710, the bearer moves the electromagnetically conductive case 904 so as to expose the transaction card 710. In some embodiments, as shown in FIG. 9B, the electromagnetically conductive case 904 is designed to slidably engage the transaction card 710, and to be prevented from coming free of the transaction card 710 by one or more detents 719, which can be sprung structures. As shown in FIG. 9B, the electromagnetically conductive case 904 is designed to slide in the directions indicated by the bi-directional arrow A, and is depicted in phantom drawing in a position where the RF portion 716 is exposed. In some embodiments, additional metallization is provided at the end 750 of the transaction card 710, to completely enclose the RFID portion 716 within a conductive envelope when the electromagnetically conductive case 904 is positioned in registry with the end 750.

Figure 9C:
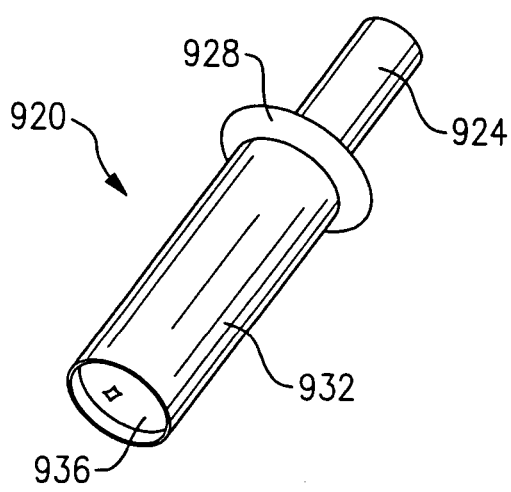
Figure 9D:
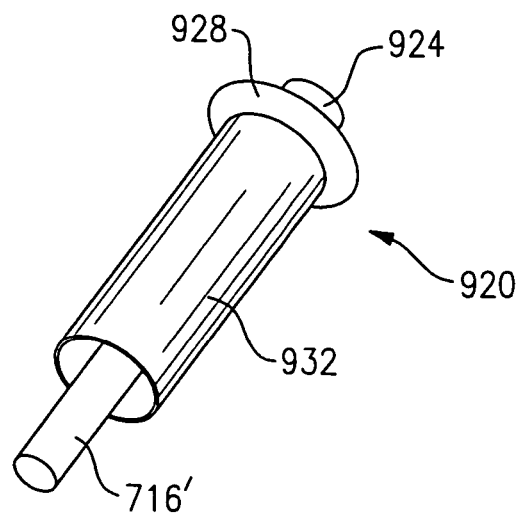

Referring to FIGS. 9C and 9D, in another embodiment the payment token is a fob 920 that comprises retractable RF payment circuitry 716'. The fob 920 also comprises a plunger stem 924, finger grips 928, and an electromagnetically conducive shield portion 932. The electromagnetically conductive shield portion 932 includes a moveable opening 936. The fob 920 further includes a spring mechanism (not shown) that maintains the RF payment circuitry 716' shielded within the electromagnetically conductive shield portion 932 so that unauthorized readings of the RF payment circuitry 716' can not occur. In operation, in one embodiment, when a user/customer desires to employ the fob 920 to purchase goods, the user/customer depresses the plunger stem 924 by, for example, pushing on the plunger stem 924 with his or her thumb while holding the finger grips 928 with her or her fingers. In one embodiment when the plunger stem 924 is sufficiently depressed, the movable opening 936 opens and the RF payment circuitry 716' is exposed as it is pushed out of the electromagnetically conductive shield portion 932. Once exposed, the RF payment circuitry 716' can then be used to conduct a financial transaction such as purchasing goods or the like. Once use of the RF payment circuitry 716' is no longer required, the user/customer releases pressure on the plunger stem 924 thereby causing the RF payment circuitry 716' to be withdrawn in to the electromagnetically conductive shield portion 932 to prevent unauthorized readings, and movable opening 936 is closed once again. In some embodiments, the moveable opening 936 is optionally omitted if the electromagnetically conductive shield portion 932 is sufficient to prevent electromagnetic communication with the RF payment circuitry 716' when it is retracted within the electromagnetically conductive shield portion 932. In one embodiment, the fob 920 can be a key fob that can be attached to a key chain for ease of access and use.

In alternative embodiments, security for a payment token can include mechanisms for enabling and disabling the operation of the payment token. In one embodiment the transaction card 710 includes a pressure sensitive region that must be grasped firmly by a user/customer for the transaction card 710 to be active. In one embodiment, the pressure sensitive region includes an electronic circuit that remains open, and hence inoperable, unless pressure is applied by the user/customer in which case the electronic circuit is closed. In one embodiment the electronic circuit can comprise a portion of the RF payment circuitry 716', such as a portion of an antenna that must be closed before the antenna can receive or transmit signals.

Readers other than radio frequency readers for inputting machine-readable information are known. Sometimes, it appears to be convenient to use data in the format of an existing reader technology because the existing technology is sufficiently well known, and hardware to exploit data in the format of that technology exists in the marketplace. In such an instance, one may try to simulate the behavior of the existing technology, so as to "piggyback" upon the existing knowledge, acceptance of the older technology, and installed base. One way to do so is to read the required data, and to translate it so as to simulate the data in the format that would have been provided by the older technology. However, there are disadvantages that such "piggybacking" introduces, including additional hardware, additional processing to use the read data in the format that is to be simulated, slower overall throughput, and the risk of possibly introducing errors during the additional data manipulation. An additional disadvantage is the added cost of hardware and software, of additional processing, and of error correction. While it may possibly take longer to implement and to reach acceptance, direct use of the data provided by a reader technology in its native format is often more reliable, faster, more cost effective, and by eliminating unnecessary hardware and software, more practical to use and to maintain.

As used herein, the term "payment token" is used to denote a non-cash financial instrument or accepted medium of payment. Examples of payment tokens include but are not limited to a credit or debit card, a check, scrip, a coupon, a gift check, a traveler's check, a prepaid card such as a phone card, an ATM card, or any other medium by which a vendor can be assured that payment has been made in advance or is reasonably expected to be made in settlement of a periodic statement of account. In additional embodiments, payment tokens can include or be included in cell phones, personal data assistants, pagers, watches, or other personal electronic devices of arbitrary form factor capable of being enabled with RF or RFID circuitry to conduct commercial transactions with, for example, transaction terminals or point of sale locations. As discussed elsewhere, payment tokens including RF or RFID circuitry can also be integrated into human attachment systems such as rings, bracelets, necklaces and the like.

It is known to use radio frequency tags and associated readers in transactions wherein the tag is a payment token issued to a user (or purchaser) for a particular type of transaction, e.g., an RFID-based ticket restricted to be used for obtaining transportation services, or an RFID tag issued (in association with an account) by a transportation authority, such as the FastLane™ tag issued by the Massachusetts Turnpike Authority for use on one or more toll roads, which payment token is not acceptable as payment for other goods or services. For example, a FastLane™ transponder cannot be used to pay for travel services requiring tickets, such as airline or bus tickets, or for any tangible goods at all.

It is also known to use proprietary radio frequency tags and associated readers as payment tokens for a variety of goods sold by vendors having a business relationship with the issuer of the payment token, e.g., the Mobil SpeedPass™ which can be used for the purchase of fuel and for the purchase of goods from vendors who are affiliated with the ExxonMobil Corporation as dealers, but which payment tokens are not generally accepted as cash substitutes by unaffiliated gasoline dealers, nor are they generally accepted by other unaffiliated third party vendors. Such a payment token can be viewed as being restricted for use to conduct transactions with the issuer and its business associates. Other examples of proprietary payment tokens are cards issued for use with a particular vendor, such as a store credit card, that is not accepted for payment by competing businesses, nor by unaffiliated third party vendors.

In contrast, credit or debit cards issued by banks or other financial institutions, which are accepted by any vendor that subscribes to the issuer's association, are viewed herein as being unrestricted. Examples include cards known generally as Visa™ cards, MasterCard™, American Express™ cards, Discover™ cards, and the like, as well as cards issued by financial arms of manufacturing or operating corporations, such as the GM™ or AT&T™ card, which may also be affiliated with the Visa™ and/or MasterCard™ financial associations.

Having provided the above outline, one can consider various features of a transaction. One feature is whether there are restrictions on the use of a payment token for transactions with business associates of the issuer (e.g., the payment token is proprietary and may use a proprietary encoding method or format). A second feature is whether the payment token can be used to purchase substantially any good or service without restriction (e.g., whether or not the encoding is proprietary such that the reader associated with the card fails to respond to formats other than that of the restricted type). Yet another feature is whether, subject to legal limitations such as patent, trademark, and copyright issues, a purchaser can purchase a desired good or service at any vendor of his or her choice using a payment token.

As used herein, an ad libitum financial transaction is used to denote a financial transaction which is neither a transaction using a payment token issued for a particular transaction type, such as purchasing transportation services, nor a financial transaction in which a proprietary financial token that is accepted for payment by those having a business relationship, such as being a dealer, with the issuer of the proprietary financial token. Expressed in an alternative manner, as used herein, an ad libitum financial transaction is one in which a purchaser is free to present a payment token issued by a first entity as payment to a second entity for a good or service of the purchaser's election, where the first and second entities are not restricted to having an ownership or dealership relation with each other, but participate within the financial systems generally. The prototypical ad libitum financial transaction is a purchaser buying whatever good or service he or she desires with cash from a vendor of his or her choosing. Examples of ad libitum financial transactions mediated with a payment token are the purchase of goods and services as elected by a purchaser who pays with a conventional credit or debit card issued by a financial institution, with a check and a bank card, or with a prepaid gift card or coupon, wherein the purchaser can in principle use the payment token for purchases at a plurality of unrelated vendors.

In various embodiments, the ad libitum financial transaction is conducted by a terminal and is intermediated by a payment token. In one additional embodiment, the terminal also comprises an image reader and decoder for reading and decoding bar codes, symbols, graphics or indicia.

In another embodiment, an ad libitum financial transaction employs a transaction module. The transaction module comprises a radio frequency reader module that interrogates a payment token to receive financial payment data. The radio frequency reader module is capable of interrogating RFID circuits and RF payment devices such as payment tokens. The payment token is issued by one of a first plurality of commercial/financial entities, such as a VISA™ credit card issued by a particular bank. The transaction module also comprises a transaction processing module that is in direct communication with the radio frequency reader module and in communication with a payment processing entity. The direct communication between the transaction module and the radio frequency reader module means that the transaction module does not include a translation module that translates data read from the payment token into a simulation of an alternative payment data format, such as the magnetic stripe data format, before being transmitted from the radio frequency reader module. In one embodiment, the transaction module is located in a commercial establishment such as a retail or convenience store that sells a variety of goods to the public.

In one embodiment, the commercial establishment is associated with or run by one of a second plurality of commercial entities. According to this embodiment, the one of the first plurality of commercial entities is different from the one of the second plurality of commercial entities. For example in one embodiment if the payment token was a RF enabled VISA™ card issued by Citizens™ Bank, then the commercial establishment could be a supermarket such as Shaws™ or a gas station such as a Shell™ gas station. In general a commercial establishment is any commercial environment where a payment token can be used to conduct a commercial transaction such as the purchase of goods or services.

In one embodiment, the transaction module is implemented as a combination of hardware and software. In various embodiments, the transaction module can be one of the Transaction Team™ 8870 Image Kiosks, 8810 or 3101 Transaction Terminals, or 1500 Signature Capture Pads available from Hand Held Products, Inc. constructed in accordance with the invention. In various other embodiments, the transaction module can be any of the IMAGETEAM™ linear or area image readers such as the models 3800, 3870 and 4410 available from Hand Held Products, Inc. constructed in accordance with the invention. In alternative embodiments, the transaction module can be a SCANTEAM® 5700 Hand Held Laser Scanner, a VALUETEAM™ 3080 Contact CCD Scanner, or a SCANTEAM® 3700 Fixed Mount CCD all available from Hand Held Products, Inc. and constructed in accordance with the invention. In further embodiments, the transaction module can be any one of the Dolphin® 7200, 7300, or 7400 Mobile Computers available from Hand Held Products, Inc. constructed in accordance with the invention.

In a further embodiment, the transaction module can receive operating updates, such as software or firm ware updates, to supplement its operation. In one embodiment, the updates comprise software modules that allow the transaction module to process payment tokens issued by at least one additional commercial entity. Frequently some commercial entities have technology or data formats that are particular to the specific commercial entity. For example, a retailer could issue its own payment token such as a key fob that stored and transmitted data in a format specific to that retailer. According to one embodiment of the invention, the transaction module could download software that enabled it to read commercial entity specific payment tokens. In one embodiment, the downloading of supplemental software or firm ware is directed by an operator instructing the transaction module as to the supplemental material required. For example if transaction modules were installed in a retail establishment employing retailer specific payment tokens, configuring the transaction modules could include downloading or installing the software and/or firmware required to read the specific payment tokens. In another embodiment, the transaction module requests supplemental software and/or firm ware in response to attempting to read a payment token with non-standard or unfamiliar data formats. As part of the attempted read in one embodiment, the transaction terminal can extract information identifying the software and/or firm ware required to read the payment token. In another embodiment, the transaction module can be configured to periodically search for supplemental or updated software and/or firmware.

As used herein embodiments described employing RFID systems are intended to cover all forms of systems that that can be interrogated with radio frequency energy to retrieve and/or store data. For example such systems include devices that in response to interrogation by specified RF energy provide data used to complete a commercial transaction. An example of such a system is a RF payment token.

Machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes.

Those of ordinary skill will recognize that many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein.

While the present invention has been explained with reference to the structure disclosed herein, it is not confined to the details set forth and this invention is intended to cover any modifications and changes as may come within the scope and spirit of the following claims.

What is claimed is:

1. A terminal for conducting an ad libitum financial transaction intermediated by a radio frequency payment token, said terminal comprising:
a radio frequency reader, said reader configured to read, in an arbitrary order, said radio frequency payment token and one or more RFID tags, said one or more RFID tags attached to one or more articles being purchased in said ad libitum financial transaction, said radio frequency payment token presented as a payment medium for said ad libitum financial transaction, said radio frequency reader devoid of a capability to stimulate a reader employing reader technology other than radio frequency; and
an output device for confirming that said financial transaction is being performed.

2. The terminal according to claim 1, further comprising a transaction register.

3. The terminal according to claim 2, wherein said transaction register is operated by a salesperson.

4. The terminal according to claim 1, further comprising a printer.

5. The terminal according to claim 4, wherein said printer is configured to print a transaction receipt.

6. The terminal according to claim 1, further comprising an imaging device.

7. The terminal according to claim 6, wherein the imaging device comprises a bar code reader.

8. A terminal for conducting a financial transaction, comprising:
a radio frequency reader, said reader configured to read, in an arbitrary order, one or more RFID tags and a selected one of a plurality of payment tokens employing dissimilar data formats, and to provide data corresponding to an elicited response from said selected one of a plurality of payment tokens employing dissimilar data formats;
a memory for recording data and a machine-readable program, said memory in communication with said radio frequency reader;
a communication module in communication with said radio frequency reader and said memory, said communication module configured to communicate bidirectionally with a remote computer-based apparatus; and
a processor module in communication with said memory and said radio frequency reader, said processor module configured by said machine-readable program to attempt to decode said data corresponding to said elicited response;
wherein said one or more RFID tags are attached to one or more articles being purchased in said financial transaction; and
wherein, responsive to an indication that said processor module is not configured to perform said decoding correctly, said communication module is configured to request from said remote computer-based apparatus at least one machine-readable instruction for properly configuring said processor module to decode said data.

9. The terminal of claim 8, wherein the terminal is configured to read a payment token employing a data format particular to a specific commercial entry.

10. The terminal of claim 8, wherein the terminal is configured to read a data format employing a data format particular to a specific retailer.

11. The terminal of claim 8, wherein the terminal is configured to read a payment token provided by a key fob.

12. The terminal of claim 8, further comprising an image reader and decoder for reading and decoding bar codes.

13. The terminal for claim 8, is capable of capturing an area electronic image representation.

14. The terminal of claim 8, further comprises a signature capture pad.

15. The terminal of claim 8, wherein the plurality of payment tokens are issued by a plurality of commercial entities.

16. A terminal for conducting a financial transaction, wherein the terminal comprises:

an RF transponder configured to read, in an arbitrary order, a payment token and one or more RFID tags attached to a plurality of articles in a physical proximity of said RF transponder, said RF transponder further configured to decode tag data corresponding to said one or more RFID tags; and a communication module in communication with said RF transponder, said communication module configured to communicate bidirectionally with a remote computer-based apparatus;

wherein said plurality of articles are being purchased in said financial transaction; and wherein responsive to said terminal completing a purchase of an article of said plurality of articles, said RF transponder is configured to perform at least one of: modifying a tag data stored in an RFID tag attached to said article subject to purchase completion, disabling an RFID tag attached to said article subject to purchase completion.

17. The terminal of claim 16, wherein responsive to an indication that said RF transponder is not configured to perform said decoding correctly, said communication module is configured to request from said remote computer-based apparatus at least one machine-readable instruction for configuring said RF transponder to decode said tag data.

18. The terminal of claim 16, further configured to be detachably attached to a shopping cart.

19. The terminal of claim 16, wherein said RF transponder is configured to communicate to a plurality of RFID tags using a command response protocol.

20. The terminal of claim 16 further configured, responsive to an interaction with a user, to initiate a payment transaction.

21. The terminal of claim 1, wherein the radio frequency reader is operative to transmit data read from the radio frequency payment token without translating the data into an alternative payment data format.

* * * * *